(12) United States Patent
Busjaeger et al.

(10) Patent No.: US 11,216,444 B2
(45) Date of Patent: Jan. 4, 2022

(54) SCALABLE EVENT SOURCING DATASTORE

(71) Applicant: salesforce.com, inc., San Francisco, CA (US)

(72) Inventors: Benjamin Busjaeger, San Francisco, CA (US); Michael Sgroi, San Francisco, CA (US); Sanjay Acharya, San Francisco, CA (US); Robert Libby, San Francisco, CA (US); Christopher Lish, San Francisco, CA (US); Jeremiah David Brazeau, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 92 days.

(21) Appl. No.: 16/264,407

(22) Filed: Jan. 31, 2019

(65) Prior Publication Data

US 2020/0250172 A1 Aug. 6, 2020

(51) Int. Cl.
*G06F 7/00* (2006.01)
*G06F 16/23* (2019.01)

(52) U.S. Cl.
CPC ................. *G06F 16/2365* (2019.01)

(58) Field of Classification Search
CPC ............. G06F 16/2465; G06F 11/3476; G06F 11/3006; G06F 16/2365; G06F 16/24552
USPC .... 714/43, 47.2, 57; 707/690, 736, 737, 739
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |

(Continued)

FOREIGN PATENT DOCUMENTS

EP 3266147 B1 9/2019

OTHER PUBLICATIONS

Fiorano, Event Tracking; published on Dec. 6, 2017 <https://www.fiorano.com/documentation/display/ESB1100/Events+Tracking>.

*Primary Examiner* — Md I Uddin
(74) *Attorney, Agent, or Firm* — Schwabe Williamson & Wyatt

(57) ABSTRACT

Systems, methods, and computer-readable media for event sourcing datastores are provided. Events are sent to an event sourcing datastore (ESDS) from an external service, and the events are appended to an event log. The ESDS maintains the event log in one table and the events are automatically aggregated via streaming. The ESDS is linearly scalable, and enforces uniqueness, consistency, and user-defined constraints when appending events to the event log. The aggregate state is computed asynchronously and transparently cached, which provides increased read throughput and reduced latency. Other embodiments may be described and/or claimed.

17 Claims, 9 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,850,453 B1 | 9/2014 | Zhang |
| 10,282,175 B2 | 5/2019 | Busjaeger |
| 10,474,562 B2 | 11/2019 | Donaldson |
| 10,608,961 B2 | 3/2020 | Kwong et al. |
| 10,719,533 B2 | 7/2020 | Busjaeger et al. |
| 10,832,309 B2 | 11/2020 | Busjaeger et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |

(56) References Cited

U.S. PATENT DOCUMENTS

| | | |
|---|---|---|
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0174694 A1* | 7/2007 | Yamamoto .......... G06F 11/1469 714/15 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0017442 A1 | 1/2010 | Kaijima |
| 2010/0094997 A1 | 4/2010 | Chou |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0344453 A1* | 11/2014 | Varney ................ H04L 65/4084 709/224 |
| 2014/0359537 A1 | 12/2014 | Jackobson et al. |
| 2015/0213454 A1 | 7/2015 | Vedula |
| 2016/0077798 A1* | 3/2016 | Pradeep ................ G06F 9/544 710/53 |
| 2017/0103403 A1 | 4/2017 | Chu |
| 2017/0132291 A1* | 5/2017 | Liu .................... G05B 23/0237 |
| 2017/0308573 A1 | 10/2017 | Brisebois et al. |
| 2018/0210713 A1 | 7/2018 | Busjaeger |
| 2019/0362090 A1 | 11/2019 | Peddada |
| 2020/0073972 A1 | 3/2020 | Busjaeger et al. |
| 2020/0097893 A1 | 3/2020 | Acharya et al. |
| 2020/0110826 A1 | 4/2020 | Lautenschlaeger |
| 2020/0250013 A1 | 8/2020 | Boran et al. |
| 2020/0250210 A1 | 8/2020 | Busjaeger et al. |
| 2020/0380000 A1 | 12/2020 | Busjaeger et al. |

\* cited by examiner

SCALABLE EVENT SOURCING DATASTORE

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database systems, and in particular to scalable event sourcing datastores.

BACKGROUND

In multi-tenant database systems, customer organizations (also referred to as "tenants") may share database resources in one logical database. The databases themselves are typically shared, and each tenant is typically associated with an organization identifier (org ID) column or field that may be used to identify rows or records belonging to each tenant. Each tenant may provide their own custom data, which includes defining custom objects and custom fields, as well as designating one or more custom fields to act as custom index fields. Users of a multi-tenant database system (e.g., agents of a particular organization or tenant) may obtain data from an associated tenant space, which may be used to render/display visual representations of relevant tenant data.

Event sourcing datastores store records and modifications to the records as a single operation. The state of an entity (or database object) is persisted in the event sourcing datastore as a sequence of state-changing events. Whenever the state of an entity changes, a new event is appended to a list of events (i.e., an "event log" or a "log"). An entity's current state is computed by replaying the events. In other words, instead of updating records in place, as is the case for relational databases, event sourcing involves writing a database change (an event) into an ordered event log, and a current state of the database is computed by folding over the event log.

A first conventional event sourcing technique involves event sourcing datastores built on relational databases, which provides strong consistency using Atomicity, Consistency, Isolation, and Durability (ACID) transactions. However, the first conventional event sourcing datastores do not provide high scalability because these systems cannot scale beyond one or limited number of nodes. A second conventional event sourcing technique involves event sourcing datastores built on Not Only SQL (NoSQL), which provides linear scalability using NoSQL sharding features. However, the second conventional event sourcing datastores do not provide strong consistency guarantees. A third conventional event sourcing technique involves event sourcing datastores that provide idempotence and limited scalability. However, the second conventional event sourcing datastores do not provide constraints or high enough scalability needed for business-to-consumer (B2C) applications.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 4 shows logical interactions between the elements of FIGS. 1A-3 for appending events to an event sourcing log according to various embodiments, and FIG. 5 shows example logical interactions between the elements of FIGS. 1A-3 for getting or otherwise accessing events from the event sourcing log according to various embodiments.

DETAILED DESCRIPTION

Figure 1A:
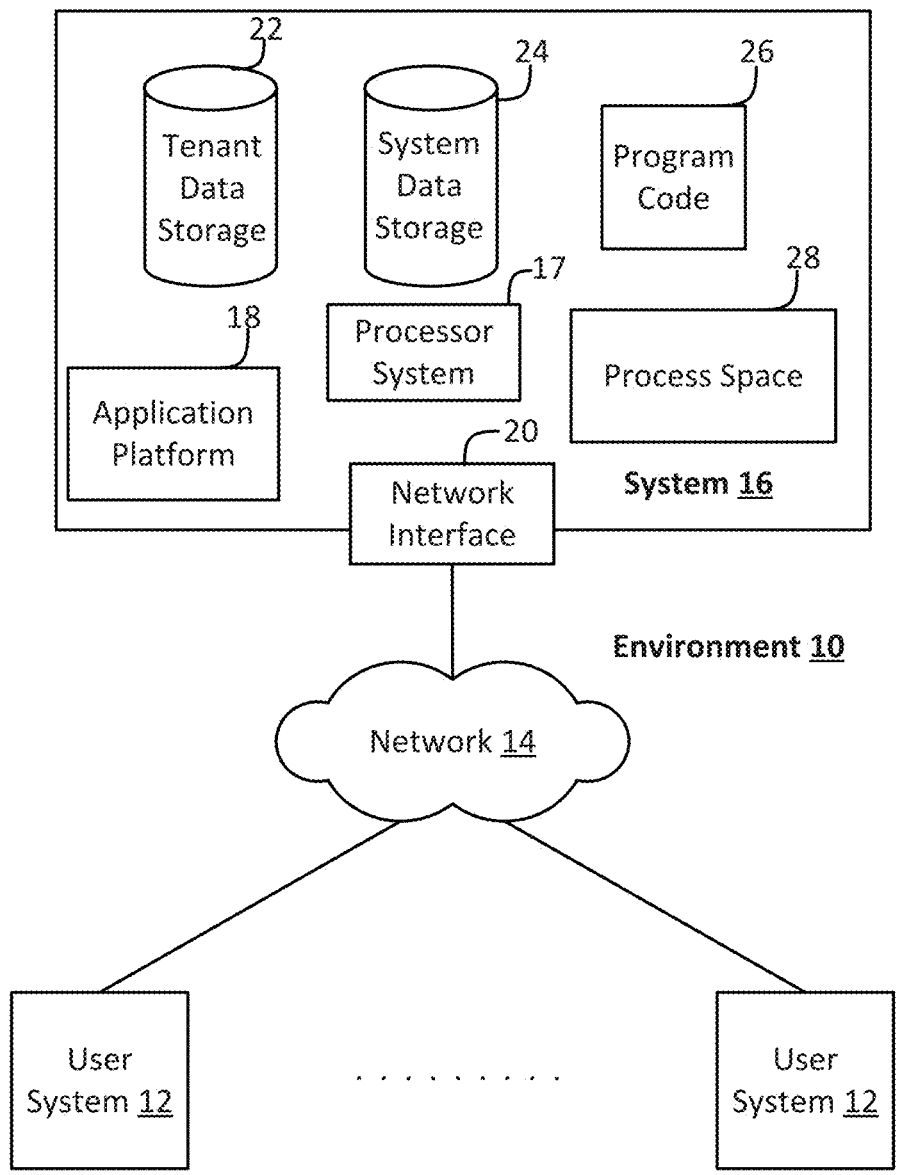
FIG. 1A shows a block diagram of an example environment in which an on-demand database service can be used according to some implementations.

Embodiments discussed herein provide event sourcing datastore technologies that are scalable and give strong consistency guarantees. Event sourcing datastores store records and modifications to the records as a single operation. The state of an entity (or database object) is persisted in the event sourcing datastore as a sequence of state-changing events. Whenever the state of an entity changes, a new event is appended to a list of events (i.e., an "event log" or a "log"). An entity's current state is computed by replaying the events. In other words, instead of updating records in place, as is the case for relational databases, event sourcing involves writing a database change (an event) into an ordered event log, and a current state of the database is computed by folding over the event log.

Using event sourcing can be advantageous because it provides an audit history in the database, and events can be appended to the log to guarantee idempotence. Idempotence means that an event is written only once and avoids record duplicates due to, for example, system or network failures or the like. Shortcomings of existing event sourcing systems is that they either provide strong consistency (records are easily and reliably modifiable) or provide high scalability (can handle high throughput with low latency). Current solutions do not provide event sourcing with strong consistency and high scalability.

In disclosed embodiments, event sourcing is accessed by user-defined services. In embodiments, a service sends events to an event sourcing datastore (ESDS), and the ESDS appends the events to an event log. The ESDS aggregates the events into an aggregate log, which is then provided to a user upon request. Embodiments include the use of event sourcing templates, which are abstract data types that are instantiated with a specified behavior. The user defines a service, that service interacts with the event sourcing template, and the ESDS applies generic behavior defined by the event sourcing template to ensure that events are appended and executed in a consistent and performant manner. In this way, users may use the event sourcing datastore without having to know how to implement data logging, and the other intricacies of event sourcing.

The ESDS includes a web tier and a streaming tier. An event processor in the web tier receives events from the user-defined service. The event processor enforces event ordering, idempotence, and constraints, and then appends the events to the event log. The event log is implemented as a key-value store, such as DynamoDB or some other NoSQL datastore. An aggregate processor in the streaming tier observes the event log, and the aggregate processor asynchronously gets an event stream from the event log. In other words, the aggregate processor picks up events from the event log, evaluates the aggregation and formulas specified by the user, and calculates an aggregate state. The aggregated state is then stored in the aggregate log. The aggregate log is included in a caching layer, which may be implemented using a suitable caching mechanism. In some embodiments, the caching layer is implemented as a write-through cache wherein both the key-value store and the cache hold the updated value of the aggregate after the aggregate state is written to the caching layer. In this way, the aggregate states are cached before a client attempts to read the aggregate state, thereby increasing throughput and reducing latency.

In order to retrieve an aggregate state, a query or request for an aggregate state is received by the web tier, and the event processor obtains the requested aggregate state from the cache layer. In most cases, the aggregate state will already be loaded in the cache as discussed above. If the aggregate state is not already in the cache, then the aggregate state is pulled from the key-value store.

In some embodiments, the events table includes a sequence number that increase monotonically, and an event ID that is assigned by the client, and the template ensures that the IDs are unique. The events in the events log are associated with an aggregate identifier, which is the same for all events. An event log stream processor updates a row in an aggregate table with the aggregate of all events in a single row of the event log. The rendering of the aggregate state is done in response to a query from the user. In this way, the user does not have to compute the current state on their own; rather, the state is pre-computed for the user. In addition, the current state is pre-cached so that the events are already computed for the user, which provides higher read throughput and lower latency.

In some embodiments, the event sourcing templates include an event object and an aggregate object. The event object defines an aggregate identifier (agg_id), a sequence number (seq_num), and an event identifier (event_id). The event object also stores a combination of the agg_id and seq_num as its primary key, and includes a secondary uniqueness constraint as a combination of the agg_id and the event_id. The aggregate object includes the agg_id and seq_num, and stores the agg_id as its primary key. The seq_num in the aggregate object is used to determine how far in the event log the aggregate state has been computed.

In some embodiments, the user defines a service to utilize the event sourcing template, which includes its own event object and aggregate object. The event object includes one or more event types, a quantity of the events, and one or more constraints on the defined event types. The constraints are conditions that must be met for an event to be appended to the event log. In other words, if an event does not satisfy the defined constraints, then the event will not be appended to the event log. The aggregate object defines how the fields in the event log are to be aggregated into the aggregate log.

In some embodiments, the multiple machines or VMs (e.g., app servers or virtual app servers) may operate individual instances of the web and streaming tiers, which provides scalability. Instead of caching the aggregate states on all of the machines/VMs, the EDES holds the aggregate states in memory and routes requests for a particular aggregate state to the same process (e.g., Java process). This conserves memory/storage resources and improves computational efficiency because the same aggregate state does not have to be calculated multiple times, and service constraints do not have to be loaded and processed more than once. In some embodiments, the events can be batched and written to the event log at the same time.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods includes more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

As used herein, the term "tenant" may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 28 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

Figure 1B:
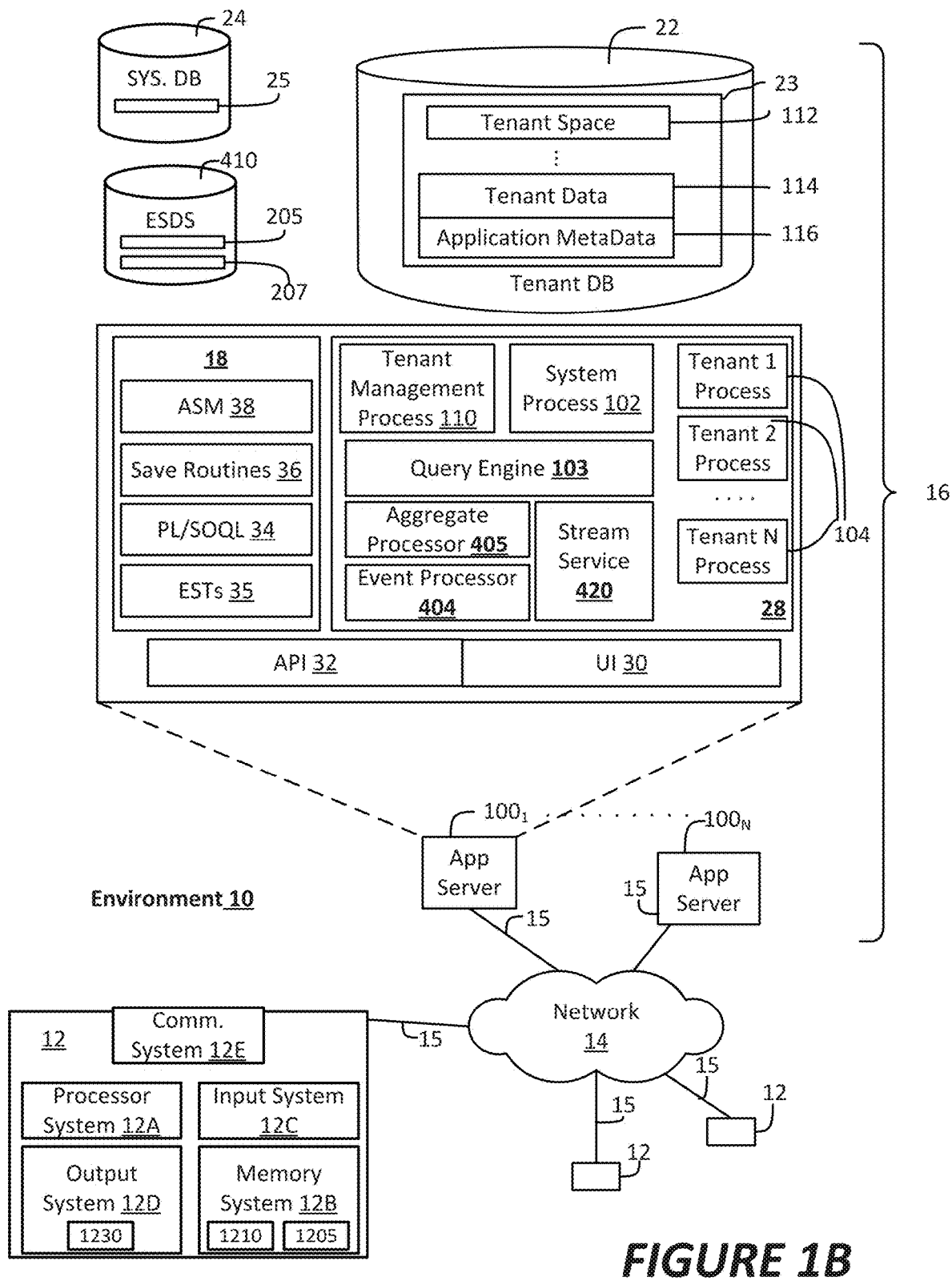
FIG. 1B shows a block diagram of example implementations of elements of FIG. 1A and example interconnections between these elements according to some implementations.

The system 16 may be a multi-tenant database system and/or a cloud computing service comprising a system and/or network of computer devices (e.g., servers, storage devices, applications, etc., such as those discussed with regard to FIGS. 1A-1B infra) that provides access to a pool of physical and/or virtual resources. In some implementations, the system 16 may provide an Infrastructure as a Service (IaaS) platform, a Platform as a Service (PaaS) cloud service platform, and/or other like services.

In embodiments, the tenant data storage 22, the system data storage 24, and/or some other data store (not shown) may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16. The applications of the application platform 18 may be developed with server-side programming languages, such as PHP, Java and/or Java Server Pages (JSP), Node.js, ASP.NET, and/or any other like technology that renders HTML. The applications may be built using a platform-specific and/or proprietary development tool and/or programming languages, such as Salesforce® Apex and/or the like.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Session Initiation Protocol (SIP) with Real-Time Transport Protocol (RTP or Secure RTP (SRTP), Web-based secure shell (SSH), Extensible Messaging and Presence Protocol (XMPP), WebSocket protocol, etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include code or source code documents, e.g., HTML, Extensible Markup Language (XML), Java Script Object Notion (JSON), Apex®, Cascading Stylesheets (CSS), JavaServer Pages (JSP), MessagePack™, Thrift™ provided by the Apache Software Foundation® ("Apache®"), Abstract Syntax Notation One (ASN.1), Google® Protocol Buffers (protobuf), database objects, or some other like object(s)/document(s). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (e.g., a "smartphone"), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (e.g., a subscriber of on-demand services provided by the system 16) of the user system 12 to access, process and view information, pages, interfaces (e.g., UI 30 in FIG. 1B), and applications available to it from the system 16 over the network 14. In other implementations, each user system 12 may operate a web or user application (e.g., application 1205 in FIG. 1B) designed to interact with applications of the application platform 18 allowing a user (e.g., a subscriber of on-demand services provided by the system 16) of the user system 12 to access, process and view information, pages, interfaces (e.g., UI 30 in FIG. 1B), and applications available to it from the system 16 over the network 14. In some cases, an owner/operator of database system 16 may have pre-built the web or user applications for use by clients, customers, and/or agents of a tenant organization (org) to access a tenant space or enterprise social network of that tenant org. In some cases, developers associated with a tenant org may build custom application(s) for interacting with the tenant data. The user (or third party) application(s) may be native application(s) (e.g., executed and rendered in an application container) or hybrid application(s) (e.g., web applications being executed/rendered in an application container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the database system 16, and/or a platform of a third party system/platform.

In an example, the user systems 12 may implement web, user, or third party applications to request and obtain data from database system 16, and render graphical user interfaces (GUIs) in an application container or browser. These GUIs may correspond with GUI 1230 and/or UI 30 shown and described with respect to FIG. 1B. In some implementations, the GUIs may include a data analytics GUI, such as Salesforce® Wave™ dashboard, which may provide visual representations of data (also referred to as visual representations 1230 or the like) residing in an enterprise cloud or in an on-demand services environment (e.g., a tenant space within database system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of database 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user_id), password, personal identification number (PIN), digital certificates, etc.) to the database system 16 so that the database system 16 may authenticate the identity of a user of the user system 12.

The web, user, or third party application(s) discussed herein may be a software, program code, logic modules, application packages, etc. that are built using website development tools and/or programming languages, such as HTML, CSS, JavaScript, JQuery, and the like; and/or using platform-specific development tools and/or programming languages (e.g., Salesforce® Apex, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), etc.). Furthermore, such applications may utilize a suitable querying language to query and store information in an associated tenant space, such as Structure Query Language (SQL), object query language (OQL), Salesforce® OQL (SOQL), Salesforce® object search language (SOSL), Salesforce® analytics query language (SAQL), and/or other like query languages.

Each user system 12 typically includes an operating system (OS) to manage computer hardware and software resources, and provide common services for various applications. The OS includes one or more drivers and/or APIs that provide an interface to hardware devices thereby enabling the OS and applications to access hardware functions. The OS includes middleware that connects two or more separate applications or connects applications with underlying hardware components beyond those available from the drivers/APIs of the OS. The OS may be a general purpose operating system or a platform-specific OS specifically written for and tailored to the user system 12.

Each user system 12 also typically includes one or more user input devices, such as a keyboard, a mouse, a trackball, a touch pad, a touch screen, a pen or stylus or the like, for interacting with a GUI provided by the browser/application container on a display (e.g., a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices (see e.g., processor system 12B of FIG. 1B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, Advanced Micro Devices (AMD) Zen® Core Architecture processor(s), such as Ryzen® or Epyc® processor(s), Accelerated Processing Units (APUs), MxGPUs, or the like; ARM-based processor(s) licensed from ARM Holdings, Ltd. such as the ARM Cortex-A family of processors and the ThunderX2® provided by Cavium™, Inc.; Centrig™ processor(s) from Qualcomm® Technologies, Inc.; Power Architecture processor(s) provided by the OpenPOWER® Foundation and/or IBM®; GeForce®, Tegra®, Titan X®, Tesla®, Shield®, and/or other like GPUs provided by Nvidia®; a MIPS-based design from MIPS Technologies, Inc. such as MIPS Warrior P-class processors; and/or the like, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 28 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E.

In FIG. 1B, the network interface 20 is implemented as a set of HTTP application servers $100_1$-$100_N$. Each application server 100 (also referred to herein as an "app server", an "application programming interface (API) server", a "worker node", and/or the like) is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. In various embodiments, the process space 28 includes an event processor 404, aggregate processor 405, and a stream service processor 420. The event processor 404 appends received events 215 to an event log 205 in an event sourcing datastore (ESDS) 410, and enforces the ordering of events, idempotence, and constraints. Updates to the event log 205 are streamed from the ESDS 410 to the stream service 420, which are then periodically read by the aggregate processor 405. The aggregate processor 405 reads a current aggregate state 208 from an aggregate table 207, applies the event updates to compute a new aggregate state 208, and then writes the new aggregate state 208 to the aggregate table 207 conditioned on the new aggregate state 208 having a new sequence number. These and other aspects are discussed in more detail infra with respect to FIGS. 2-8.

The application platform 18 includes an application setup mechanism (ASM) 38 that supports application developers' ("app developers") creation and management of applications. Such applications and others can be saved as metadata into tenant database 22 by save routines 36 for execution by subscribers as one or more tenant process spaces 104 managed by tenant management process 110, for example. Invocations to such applications can be coded using Procedural Language (PL)/Salesforce® Object Query Language (SOQL) 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

In various embodiments, the application platform 18 includes event sourcing templates (ESTs) 35. Templates are abstract data types that can be instantiated by tenants/users to employ a particular behavior. The ESTs 35 are templates that allow tenants/users to utilize the event sourcing embodiments discussed herein without having to know or learn how to implement event sourcing aspects, such as building and appending events to an event log or how to update an aggregate. In this way, the tenants/users can instantiate an instance of a particular EST 35 for a specific use case, for example, inventory management, payment processing, or the like. Based on the instance of the particular EST 35, the system 16 applies some behavior that ensures events are dependent in a consistent performant manner and that the aggregate is computed in a consistent and performant way.

The tenants/users may develop program code, script(s), etc. that instantiate an instance of a particular EST 35. This code/script(s) may be referred to as a "event sourcing definition," "event sourcing configuration," and/or the like. The event sourcing definition may be a configuration or policy that is used to define events and event sourcing implementations for a particular use case. The event sourcing definition may define various event types and values to be included the each event type, constraints/conditions for appending the events to an events log, and constraints/conditions for aggregating the events into an aggregation table. Tenants/developers can configure the event sourcing definitions both through a suitable API 32 and/or through a web based graphical user interface (GUI) 30. Where APIs 32 are used, the event sourcing definition may be developed using any suitable mark-up or object notation language, such as the various languages, tools, etc. discussed herein. The developed event sourcing definition may be pushed or otherwise sent to the system 16 using a suitable API 32 or WS. The system 16 may provide a dev-environment, programming language(s), and/or development tools that allows tenants/developers to create/edit event sourcing definitions. Examples of such dev-environment, programming language(s), and/or development tool are discussed with regard to FIGS. 1A-1B. In embodiments, the dev-environment may allow the tenants/developers to define multiple events that the system 16 may accept via API/WS 32 requests in response to receipt of suitable messages (e.g., HTTP messages) including or indicating an event. These messages may be generated and sent by the tenant platform based on detection of various user interactions with that platform. When an event takes place or is triggered at the tenant platform, the code/script(s) implemented by the tenant platform may generate and transmit a message indicating the event to the system 16, which may cause the system 16 to append the event to an events log after consistency, idempotence, and uniqueness constraints are validated. The API/WS 32 may be any suitable API/WS 32, such as those discussed herein. In one example, a RESTful API 32 may be used, where a REST API endpoint accepts event messages with event data in a JSON payload. In some implementations, the event messages may be sent in batches, and the API/WS 32 may include separate calls for single and batch event message submissions.

In various implementations, application platform 18 may be, or may include, a development environment, programming language(s), and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist an app developer in building applications, configurations, definitions, and/or the like. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., database system 16, a cloud service provider, etc.) in a web browser or application container).

The system 16 of FIG. 1B also includes a user interface (UI) 30 and an API 32 to system 16 resident processes, which allow users or developers at user systems 12 to access the resident processes. The API 32 may be implemented as a remote API or a web API, such as a Representational State Transfer (REST or RESTful) API, Simple Object Access Protocol (SOAP) API, Apex API, and/or some other like API. The API 32 may be implemented as a web service including, for example, Apache® Axi2.4 or Axi3, Apache® CXF, JSON-Remote Procedure Call (RPC), JSON-Web Service Protocol (WSP), Web Services Description Language (WSDL), XML Interface for Network Services (XINS), Web Services Conversation Language (WSCL), Web Services Flow Language (WSFL), RESTful web services, and/or the like.

In some implementations, the API 32 may include one or more public APIs and one or more private APIs. The public APIs are APIs that includes one or more publically exposed endpoints that allows user systems 12 to access tenant data and event sourcing datastores. These endpoints specify where resources are located and/or how particular web services can be accessed. The application 1210 may be used to generate and transmit a message (e.g., an HTTP message) with a user-issued query and a suitable URI/URL to access of an endpoint of the system 16. In embodiments, one or more of the public APIs may be an asynchronous ("async") query API, where the user-issued query includes an API call or other like instruction indicating that the query 212 should be treated as an aysnc query (referred to as an "async query verb"). The async query verbs to invoke the async query API may be defined by API 32 and can be coded using PL/SOQL 34 or some other suitable programming or query language. When an async query invokes the async query API, an async query engine (e.g., query engine 103) or async query scheduler may generate a corresponding async query job. An async query job entity is a record or database object that stores various values, statistics, metadata, etc. during the lifecycle of an async query, which are placed in a schedule or queue, and executed by the async query engine, in turn. The async public API may be implemented as a REST or RESTful API, SOAP API, Apex API, and/or some other like API, such as those discussed herein.

The private APIs are APIs that are private or internal to the system 16, which allows system applications (e.g., tenant management process 110, system process 102, query engine 103, event processor 504, and aggregate processor 505) to access other system applications. The private APIs may be similar to the public APIs except that the endpoints of the private APIs are not publically available or accessible. The private APIs may be made less discoverable by restricting users, devices, and/or applications from calling or otherwise using the private APIs. For example, use of the private APIs may be restricted to machines inside a private network (or an enterprise network), a range of acceptable IP addresses, applications with IDs included in a whitelist or subscriber list, requests/calls that include a particular digital certificate or other like credentials, and/or the like. The private APIs may be implemented as a REST or RESTful API, SOAP API, Apex API, a proprietary API, and/or some other like API.

Each application server 100 can be communicably coupled with tenant database 22 and system database 24, for example, having access to tenant data 23 and system data 25, respectively, via a different network connection 15. For example, one application server $100_1$ can be coupled via the network 14 (e.g., the Internet), another application server $100_{N-1}$ can be coupled via a direct network link 15, and another application server $100_N$ can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used. The application servers 100 may access the tenant data 23 and/or the system data 25 using suitable private APIs as discussed previously.

In some implementations, each application server 100 is configured to handle requests for any user associated with any organization that is a tenant of the system 16. In this regard, each application server 100 may be configured to perform various database functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (e.g., an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (e.g., in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (e.g., an application server 100 in the system 16) can automatically generate one or more native queries (e.g., SQL statements or SQL queries or the like) designed to access the desired information from a suitable database. To do so, the system 16 (e.g., an application server 100 in the system 16) may include one or more query engines 103, which is/are a software engine, SDK, object(s), program code and/or software modules, or other like logical unit that takes a description of a search request (e.g., a user query), processes/evaluates the search request, executes the search request, and returns the results back to the calling party. The query engine(s) 103 may be program code that obtains a query from a suitable request message via the network interface 20 that calls a public API, translates or converts the query into a native query (if necessary), evaluates and executes the native query, and returns results of the query back to the issuing party (e.g., a user system 12). To perform these functions, the query engine(s) 103 include a parser, a query optimizer, database manager, compiler, execution engine, and/or other like components. In some implementations, each of the illustrated databases may generate query plans to access the requested data from that database, for example, the system database 24 can generate query plans to access the requested data from the system database 24. The term "query plan" generally refers to one or more operations used to access information in a database system.

The query engine(s) 103 may include any suitable query engine technology or combinations thereof. As examples, the query engine(s) 103 may include direct (e.g., SQL) execution engines (e.g., Presto SQL query engine, MySQL engine, SOQL execution engine, Apache® Phoenix® engine, etc.), a key-value datastore or NoSQL database engines (e.g., DynamoDB® provided by Amazon.com®, MongoDB query framework provided by MongoDB Apache® Cassandra, Redis™ provided by Redis Labs®, etc.), MapReduce query engines (e.g., Apache® Hive™, Apache® Impala™ Apache® HAWQ™, IBM® Db2 Big SQL®, etc. for Apache® Hadoopt database systems, etc.), stream/event processing engines or stream analytics engines (e.g., Apache® Kafka®, Storm®, Flinkt, Apex®, Spark® (Spark Streaming engine), etc.; IBM® Spade, Nvidia® CUDA™, Intel® Ct™, etc.), relational database (or "NewSQL") engines (e.g., InnoDB™ or MySQL Cluster™ developed by Oracle®, MyRocks™ developed by Facebook.com®, FaunaDB provided by Fauna Inc.), PostgreSQL database engines (e.g., MicroKernel Database Engine and Relational Database Engine provided by Pervasive Software®), graph processing engines (e.g., GraphX of an Apache® Spark® engine, an Apache® Tez engine, Neo4J provided by Neo4j, Inc.™, etc.), pull (iteration pattern) query engines, push (visitor pattern) query engines, transactional database engines, extensible query execution engines, package query language (PaQL) execution engines, LegoBase query execution engines, and/or some other query engine used to query some other type of database system (such as any processing engine or execution technology discussed herein). In some embodiments, the query engine(s) 103 may include or implement an in-memory caching system and/or an in-memory caching engine (e.g., memcached, Redis, etc.) to store frequently accessed data items in a main memory of the system 16 for later retrieval without additional access to the persistent data store.

Each database can generally be viewed as a collection of objects, such as a set of logical tables, containing data fitted into predefined or customizable categories. As used herein, a "database object", "data object", or the like may refer to any representation of information in a database that is in the form of an object or tuple, and may include variables, data structures, functions, methods, classes, database records, database fields, database entities, associations between data and database entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Referring now to the user system 12 in FIG. 1B, the user system 12 includes a processor system 12A, which can include any suitable combination of one or more processors, such as one or more central processing units (CPUs) including single-core or multi-core processors (such as those discussed herein), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), System-on-Chips (SoCs) and/or programmable SoCs, microprocessors or controllers, or any other electronic circuitry capable of executing program code and/or software modules to perform arithmetic, logical, and/or input/output operations, or any suitable combination thereof. As examples, the processor system 12A may include Intel® Pentium® or Core™ based processor(s); AMD Zen® Core Architecture processor(s), such as Ryzen® processor(s) or Accelerated Processing Units (APUs), MxGPUs, or the like; A, S, W, and T series processor(s) from Apple® Inc.; Snapdragon™ processor(s) from Qualcomm® Technologies, Inc., Texas Instruments, Inc.® Open Multimedia Applications Platform (OMAP)™ processor(s); MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; GeForce®, Tegra®, Titan X®, Tesla®, Shield®, and/or other like GPUs provided by Nvidia®; and/or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (e.g., application 1205 and/or other applications discussed herein) for carrying out the procedures, processes, methods, etc. of the embodiments discussed herein, as well as an operating system (OS) 1205 and one or more databases or database objects (not shown).

The OS 1205 manages hardware and software resources of the user system 12, and provides common services for the applications via one or more drivers and/or APIs that provide an interface to hardware devices thereby enabling the OS 1205 and applications to access hardware functions. The OS 1205 or some other code stored in memory system 12B may include middleware that connects two or more separate applications or connects applications with underlying hardware components beyond those available from OS and/or the drivers/APIs. The OS may be a general-purpose operating system or an operating system specifically written for/tailored to the user system 12.

The application 1210 is a software application designed to run on the user system 12 and is used to access data stored by the database system 16. The application 1210 may be platform-specific, such as when the user system 12 is implemented in a mobile device, such as a smartphone, tablet computer, and the like. The application 1210 may be a native application, a web application, or a hybrid application (or variants thereof). The application 1210 may be developed using any combination of one or more programming languages, including an object oriented programming language such as Python, PyTorch, Ruby, Scala, Smalltalk, Java™, C++, C#, Rust, or the like; a procedural programming languages, such as the "C" programming language, the Go (or "Golang") programming language, or the like; a scripting language such as JavaScript, Server-Side JavaScript (SSJS), PHP, Pearl, Python, PyTorch, Ruby or Ruby on Rails, Lua, Torch/Lua with Just-In Time compiler (LuaJIT), Accelerated Mobile Pages Script (AMPscript), VBScript, and/or the like; a markup language such as HTML, XML, wiki markup or Wikitext, Wireless Markup Language (WML), etc.; a data interchange format/definition such as Java Script Object Notion (JSON), Apache® MessagePack™, etc.; a stylesheet language such as Cascading Stylesheets (CSS), extensible stylesheet language (XSL), or the like; an interface definition language (IDL) such as Apache® Thrift, Abstract Syntax Notation One (ASN.1), Google® Protocol Buffers (protobuf), etc.; or some other suitable programming languages including proprietary programming languages and/or development tools, or any other languages or tools as discussed herein. In some implementations, the application 1210 may be developed using platform-specific development tools and/or programming languages such as Salesforce® Apex, Salesforce® Visualforce®, Salesforce® Lightning®, Salesforce® Wave™ Dashboard Designer, Salesforce® Force.com® IDE, Android® Studio™ IDE, Apple® iOS® SDK, etc. Suitable implementations for the OS 1205, databases, and applications 210, as well as the general functionality of the user system 12 are known or commercially available, and are readily implemented by persons having ordinary skill in the art, particularly in light of the disclosure herein.

The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks. The output system 12D is used to display visual representations and/or GUIs 1230 based on various user interactions.

The communications system 12E may include circuitry for communicating with a wireless network or wired network. Communications system 12E may be used to establish a link 15 (also referred to as "channel 15," "networking layer tunnel 15," and the like) through which the user system 12 may communicate with the database system 16. Communications system 12E may include one or more processors (e.g., baseband processors, network interface controllers, etc.) that are dedicated to a particular wireless communication protocol (e.g., WiFi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In other implementations, the environment 10 may not have the same elements as those listed above or may have other elements instead of, or in addition to, those listed above.

II. Event Sourcing Embodiments

Figure 2:
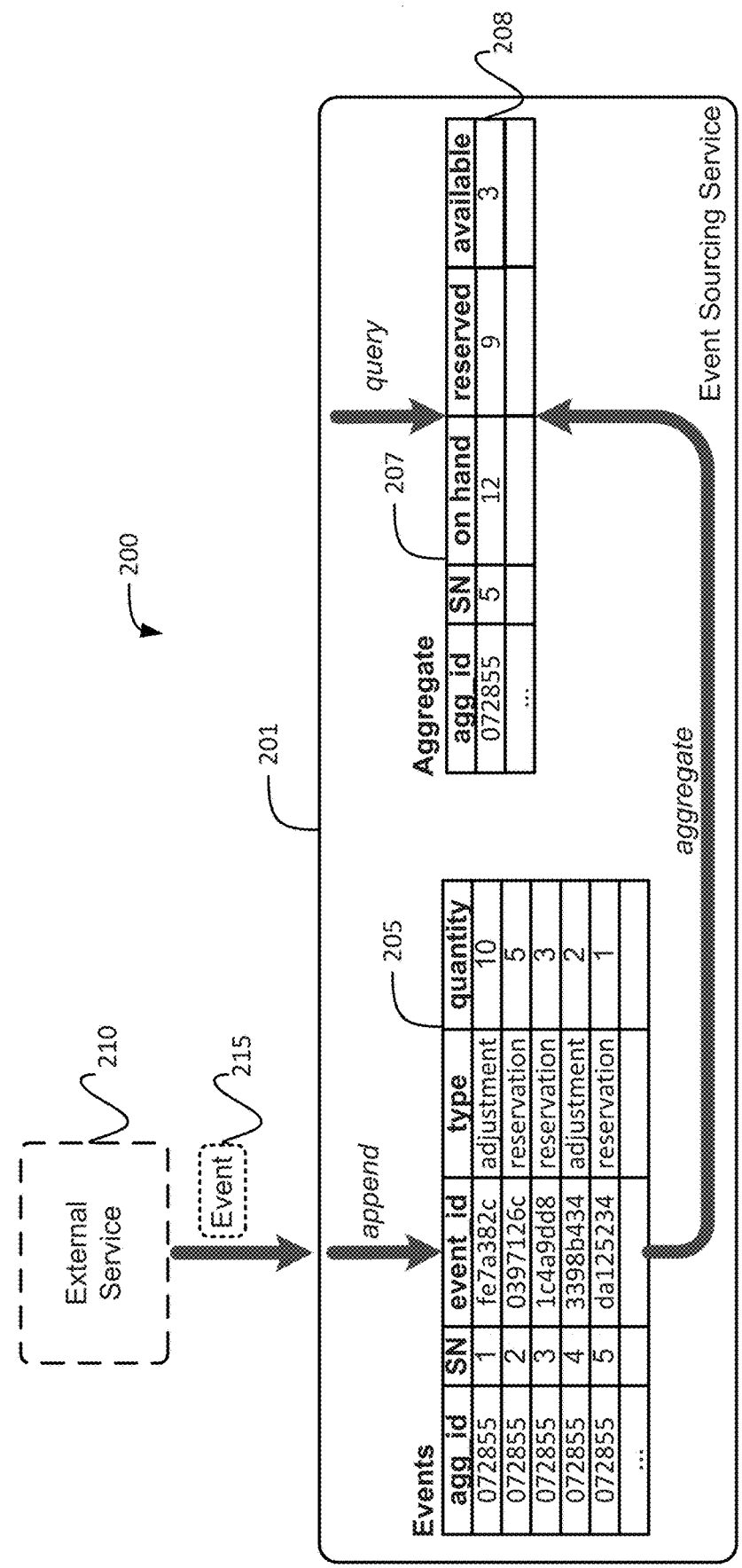
FIG. 2 shows a high level overview of event sourcing according to various embodiments.

FIG. 2 illustrates a high level overview of event sourcing according to various embodiments. As shown by FIG. 2, the event sourcing example 200 includes an event sourcing service (ESS) 201, which receives events 215 from external services 210. The ESS 201 uses an events sourcing datastore (e.g., such as ESDS 560 of FIGS. 1B and 4-5) to persist (or store) the events 215 and runs the events to compute an aggregate state 208. When an event 215 is received from the external service 210, the ESS 201 appends the event 215 into an event log 205. An event 215 is an object that is shared between at least two processes. A process being operated by the external platform 210 sends a message including an event 215 to the ESS 201, where the act of sending an event 215 message is referred to as a "publish" or as "publishing an event." As used herein, an event message is a message that contains data about an event 215, and is sometimes referred to as an "event notification," "notification," or the like. One or more processes of the ESS 201 subscribe to the event 215 and/or the external platform 210 and listen for the publish of the event 215.

When an event 215 is appended to the event log 205, a new sequence number (SN) is generated and the event 215 is appended as the next row/record in the event log 205. The ESS 205 periodically or continuously aggregates all of the events 215 in the event log 205 with a same aggregation identifier (agg_id) up to a particular SN into individual record 208 in an aggregate table 207. The ESS 201 also stores the agg_id, SN, and other information in the individual record 208. The aggregation table 207 can then be queried by individual clients/users (e.g., user systems 12) to obtain an aggregate state indicated by individual records 208 in the aggregation table 207. The records in the aggregation table 207 may also be referred to as an "aggregate state 208." The rendering of the aggregate state 208 is done by querying the aggregate table 207 directly. By pre-computing the aggregate state 208 in this way provides querying clients (e.g., user systems 12) with a relatively high throughput read through record 208. This is because the clients do not have to query the event log 205 to read individual events 215 and compute the aggregate state, as is the case with conventional event sourcing technique. As discussed in more detail infra, the aggregate state may also be pre-cached for client querying, which gives even higher throughput and lower latency.

In various embodiments, the ESS 201 supports appending events 215 to the event log 205 via a suitable event sourcing API 32. Internally, each event 215 is stored as an event object, which corresponds to an individual row or record in the event log 205 and indicates individual items that are reserved or adjusted (e.g., a quantity of a particular agg_id at a particular location or location group). In some embodiments, the events 215 may be state machines that track individual item states. The events 215 are stored as event objects in the event log 205 via an event sourcing pattern, which is discussed in more detail with respect to FIG. 3.

As shown by FIG. 2, the event log 205 includes various fields, such as an agg_id field, an SN field, an event identifier (event_id) field, and an event type field. In embodiments, the agg_id field and the SN fields may be standard fields and the other fields may be user defined. The agg_id is used to aggregate all of the events 215 with the same agg_id into a single record 208 of the aggregate table 207. As alluded to previously, the SN in the SN field monotonically increases each time an event 215 received and appended to the event log 205. The event_id field includes an identifier (ID) associated with each event 215. The event_id may be assigned by the external service 210 or may be generated by the ESS 201 based on rules/instructions provided by the order service 210. For example, the order service 20 may develop an EST 35, which indicates how an event_id is to be generated (e.g., using a suitable hash function or the like) to ensure that the event_id is unique when an event 215 is appended to the event log 205. This allows idempotence to be enforced by the system. For example, if the external service 210 sent the fifth event with an event_id of "da125234" right before a network error occurred resulting in an error message being received by the external service 210, and the order service 210 were to send that event 215 to be appended again, the ESS 201 would ensure that this event 215 is not appended to the event log 205 again. Instead, the ESS 201 would send a response message to the external service 210 indicating that this event 215 has already been appended to the event log 205. This response message may include the event_id, SN, and/or other like information including information in the event record. Other fields may be included in the event log 205 and/or the aggregate table 207 based on the particular use case being implemented.

An example use case involves the external service 210 being an order service ("order service 210") and the ESS 201 being an inventory service ("inventory service 201"), where the event log 205 ("inventory event log 205") includes a type field and a quantity field in addition to the agg_id field, SN field, and event_id field. When an order is placed by a customer (e.g., user system 12) of the order service 210, the order service 210 sends an order event 215 to the inventory service 201 to be appended to the inventory event log 205.

The events 215 appended to the inventory event log 205 are associated with an agg_id. In this example, the agg_id may be a stock keeping unit (SKU) or some other like identifier, which may be selected or defined by the order system 210 (e.g., a "custom" agg_id). As shown by FIG. 2, all of the events 215 are associated with the same agg_id, "072855," and the events 215 with agg_id "072855" have been aggregated up to SN 5 in a single record 208 in the inventory aggregate table 207. From the events 215, the inventory service 201 has computed that there are twelve items on-hand, nine of which are reserved, and therefore, three of those items are available. An external system (e.g., a user system 12) may query the aggregate table 207 to obtain an aggregate state 208. In the inventory service example, the querying of the aggregate table 207 may take place when a user system 12 requests and/or renders a product detail (web) page. The query response message sent to the user may include the aggregate state as a payload.

Figure 3:
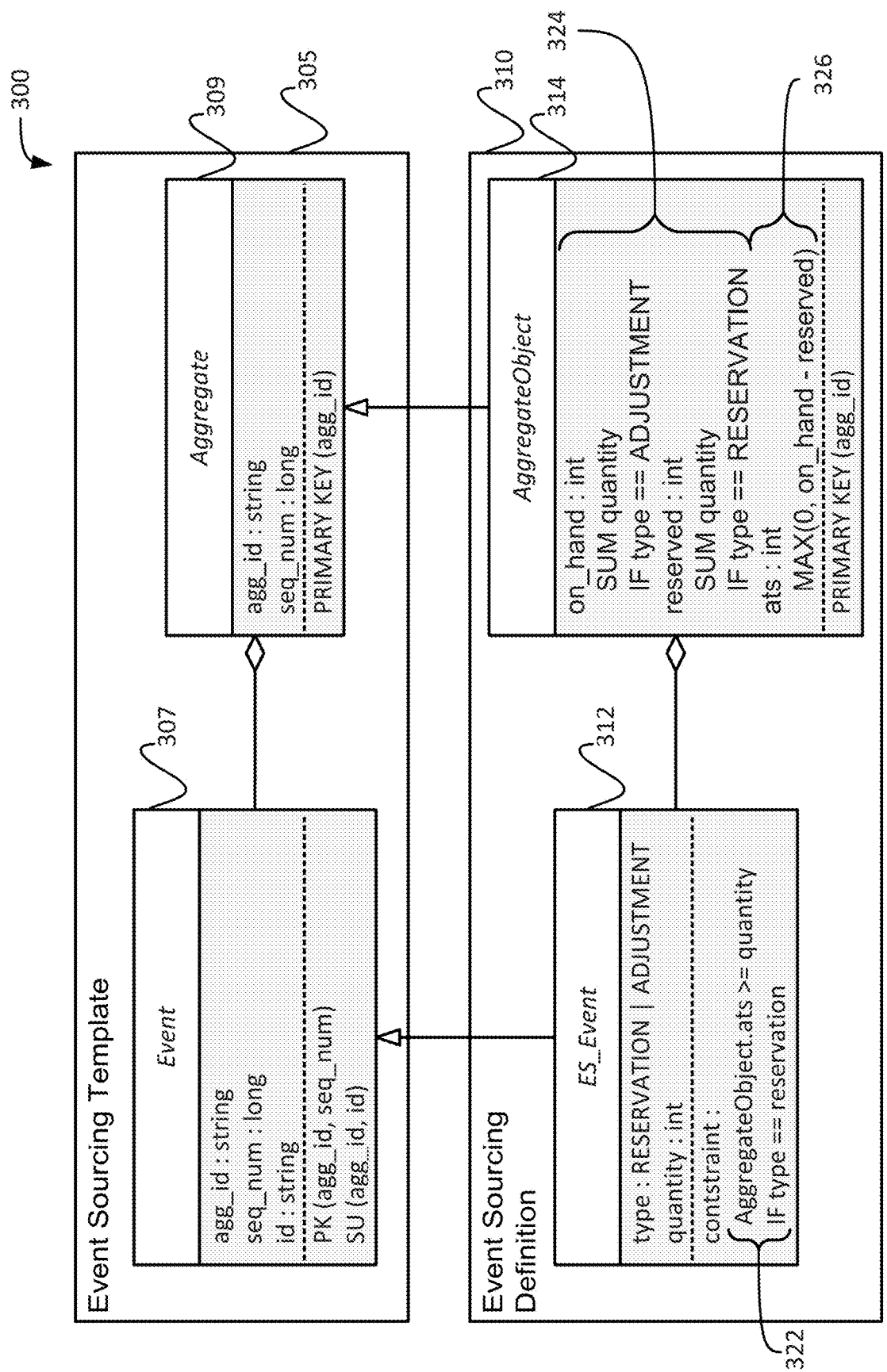
FIG. 3 shows an example UML diagram for carrying out various embodiments discussed herein.

FIG. 3 shows an example UML diagram 300 for carrying out various embodiments discussed herein. The UML diagram 300 has the following graphical characteristics. A box in the UML diagrams represents a class. A class is shown with three compartments. The top compartment indicates the class name or label. The middle compartment holds a list of attributes. An "attribute" is a typed element representing a property of a class, and a typed element implies that the element can only refer to a constrained set of values. In other words, an attribute is a significant piece of data containing values that describe each instance of that class, and are also referred to as fields, variables, instance variables, properties, data types, etc. The bottom compartment holds a list of methods, functions, operations, etc. that provide the functionality of the class. A relationship between two classes is shown by a line with an arrowhead at one end of the line. The end of the line without the arrowhead is the source model element that has a pointer to the target model element. The association end(s), specifies the role that the object at one end of a relationship performs. Each end of a relationship may or may not have properties that specify the role, multiplicity, visibility and navigability. A generalization relationship is shown as a line with a hollow triangle as an arrowhead. A generalization relationship indicates a relationship in which a child class inherits from a parent class. A generalization relates a specific model element to a more general model element, and is owned by the specific model element. The specific model element may be fully consistent with the general model element and adds additional information. The arrowhead points to the entity representing the general classifier and the end of the line without the arrowhead is the specific classifier. A hollow diamond attached to the end of a relationship is used to indicate an aggregation, where the diamond is attached to the class that is the aggregate. An aggregation is a special type of association in which objects are assembled or configured together to create a more complex object. Aggregation protects the integrity of an assembly of objects by defining a single point of control called aggregate, in the object that represents the assembly. A filled diamond attached to the end of a relationship line is used to indicate a composite aggregation, where the diamond is attached to the class that is the composite. A composite aggregation is a strong form of aggregation that requires a part instance to be included in at most one composite at a time. If a composite is deleted, all of its parts are deleted as well.

Referring now to FIG. 3, which shows an example UML diagram 300 of an event sourcing template according to various embodiments. The UML diagram 300 shows the various classes (including their attributes and operations/functions) and the relationships among objects for the event sourcing template (EST) 305. The EST 205 may correspond to the ESTs 35 discussed previously with regard to FIG. 1B.

In FIG. 3, the EST 305 includes two classes including an Event class 307 and an Aggregate class 309. In embodiments, the Event 307 and Aggregate 309 classes may be abstract types (e.g., objects that cannot be instantiated directly) or interfaces (e.g., objects with no or incomplete implementations). The Event 307 specifies attributes including an aggregate ID (agg_id), a sequence number (seq_num), and an event ID (ID). The Event 307 also defines operations including a primary key (PK) and a secondary uniqueness (SU). The PK includes the agg_id and the seq_num, where the agg_id and seq_num pair has to be unique. The SU has constraints on the agg_id and the event ID. The Aggregate 309 specifies attributes including the agg_id and the seq_num. The Aggregate 309 stores the agg_id as its primary key, and uses the seq_num to indicate how far in the event log 205 the aggregation has been computed.

Using the EST 205, clients or users of the system 16 (e.g., user systems 12) may define an event sourcing definition (ESD) 310 with concrete classes that extend corresponding base (abstract) classes in the EST 205. The ESD 310 may correspond with the event sourcing definition discussed previously with regard to FIG. 1B. The ESD 310 comprises concrete classes (e.g., an instantiation of the abstract classes of EST 305) including an event sourcing event (ES_Event) class 312 and an aggregate object (AggregateObject) class 314. The Event 307 inherits the behavior of the ES_Event 312 and the Aggregate 309 inherits the behavior of the AggregateObject 314.

The clients/users define the ES_Event 312 to indicate the different types of events that can be appended to the event log 205 and various constraints (or validation rules) 322 that are to be enforced by the ESS 201. The validation rules 322 are used to verify that data to be written into records meet tenant/developer defined standards before that data is written into those records. The validation rules 322 may include one or more formulas or expressions that evaluate the data in one or more fields, and returns a Boolean value (e.g., "True" or "False") based on the evaluation. The validation rules 322 can also include error messages to be displayed based on specified criteria. For example, the validation rules 322 may indicate a first error message to be sent to a querying user when invalid values are included in an event message and a second error message to be sent to a querying user when an event 215 cannot be appended to the event log 205.

In addition to enforcing the primary key and secondary uniqueness constraints, the ESS 201 appends events 215 to the event log 205 only when the defined constraints 322 are satisfied. The clients/users define the AggregateObject 314 to indicate how the different values or fields are to be computed from the event log 205. In particular, the AggregateObject 314 includes a roll-up summary field 324 indicating objects that are to be aggregated based on conditions/constraints indicated by a formula field 326. While formula fields 326 include expressions or operations to calculate values using fields within a single record, roll-up summary fields 324 calculate values from a set of related records, such as those in a related list. The tenant/developers can create roll-up summary fields 324 that automatically display a value on a master record based on the values of records in a detail record, which is directly related to the master record through a master-detail relationship. Different types of calculations can be performed using roll-up summary fields 324 such as, for example, counting a number of records, calculating a sum, minimum value, and/or maximum value.

Continuing with the inventory use case example discussed previously with regard to FIG. 2, a client may define the ESD 310 for the inventory service 201, where the ES_Event 312 is an inventory event (InventoryEvent) 312 and the AggregateObject 314 is an inventory object (InventoryObject) 314. As shown by FIG. 3, the client defines the InventoryEvent 312 to indicate different types of events 215 that can be appended to the inventory event log 205 and a quantity. The event types include "reservation" and "adjustment" events, and the quantity indicates an amount of a particular item that was reserved or restocked.

Additionally, the InventoryEvent 312 includes validation rules 322 to be enforced. As shown by FIG. 3, the validation rules 322 include an available to sell (ATS) field on InventoryObject 314, which indicates that the aggregates must be at least as much as the quantity being reserved (e.g., "AggregateObject.ats>=quantity" in FIG. 3) if a type of the InventoryEvent 312 is a "reservation" event (e.g., "IF type=reservation" in FIG. 3). In other words, if an inventory event 215 is received and the current state of the inventory event log 205 is an SN up to five, the InventoryEvent 312 will only append that inventory event 215 to the aggregate table 207 with an SN of six if the event_id in that inventory event 215 is not already taken and the defined constraint 322 holds. In this way, the ESS 201 and/or ESD 310 guarantees that consistency and uniqueness are satisfied at every point in the event log 205, which is different than conventional event sourcing systems.

In the InventoryObject 314, the summary field 324 indicates that an on_hand quantity is computed as the sum of quantities for events 215 having an event type of "adjustment." The summary field 324 indicates that a reserved quantity is the sum of quantities where the event type is reservation. The formula field 326 indicates that the actual ATS field is computed as the difference of (a) the reservation quantity from the on_hand quantity or (b) zero, whichever is larger.

Figure 4:
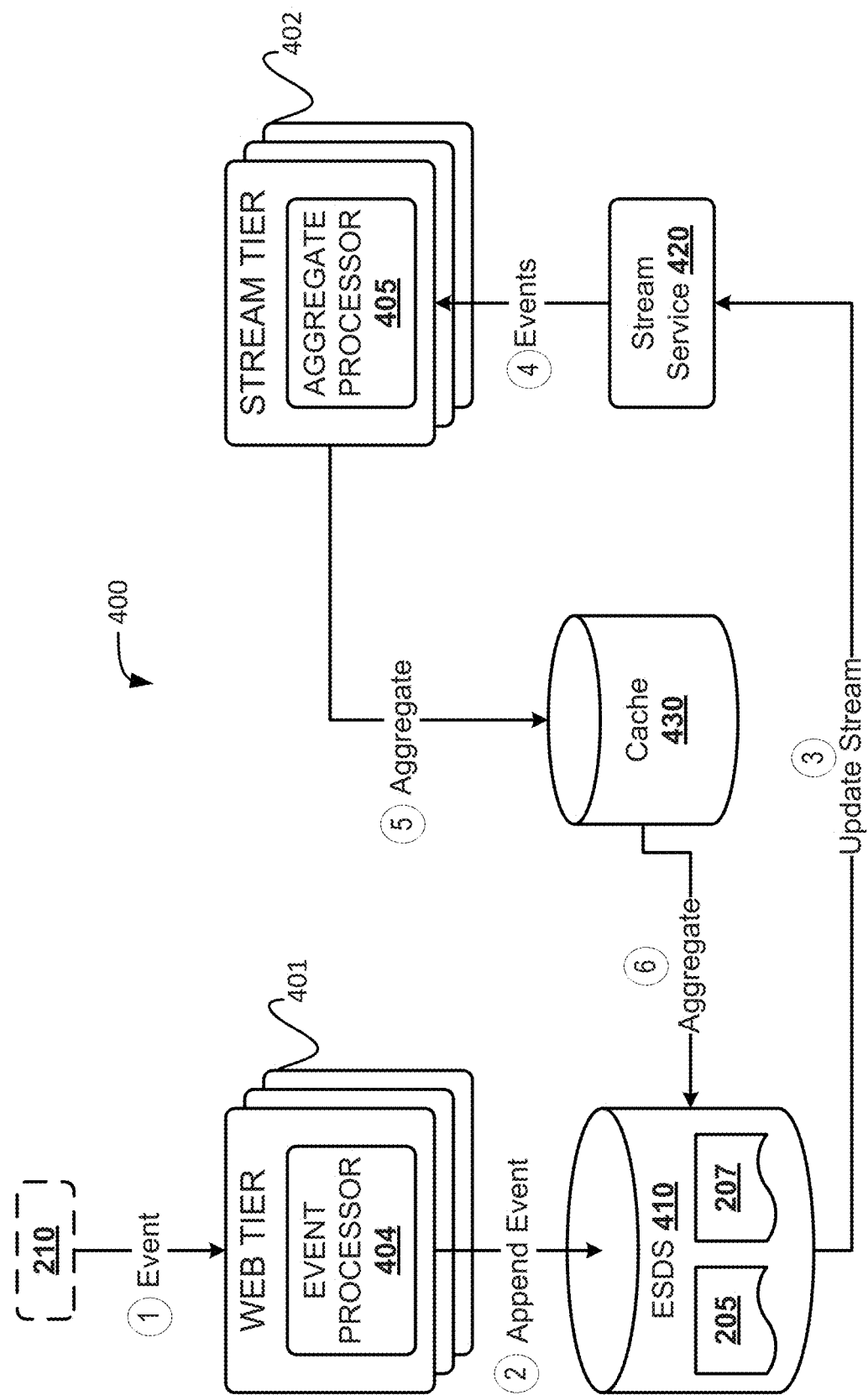
FIGS. 4-5 shows example logical interactions between the elements of FIGS. 1A-3 according to various embodiments. In particular.
Figure 5:
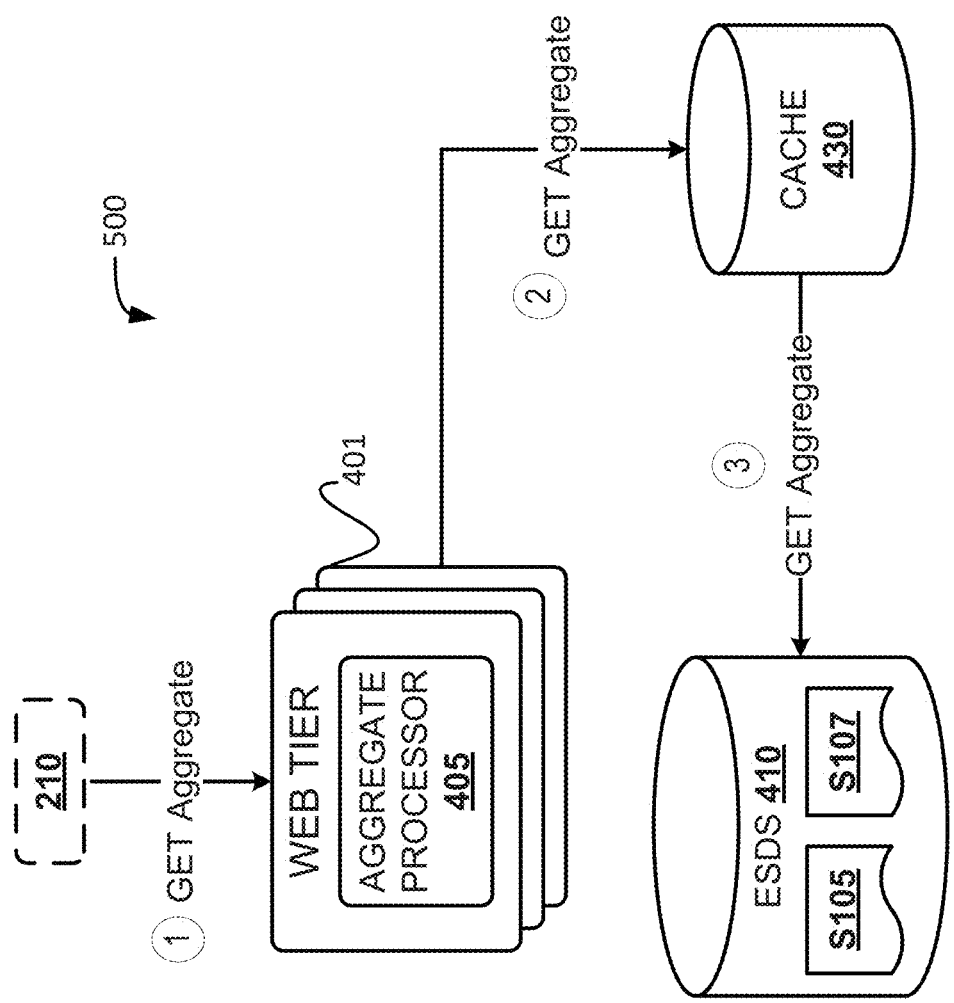

FIGS. 4-5 shows storage services 400 and 500, respectively, illustrating logical interactions between the elements of FIGS. 1A-3 according to various embodiments. In particular, FIG. 4 shows storage service 400 illustrating logical interactions between the elements of FIGS. 1A-3 for appending events to an event sourcing log according to various embodiments, and FIG. 5 shows storage service 500 illustrating logical interactions between the elements of FIGS. 1A-3 for getting or otherwise accessing events from the event sourcing log according to various embodiments. In FIGS. 4-5, like numbered items are as described with respect to FIGS. 1A-4. The storage services 400 and 500 are standalone service(s) including individual instances of a web tier 401, individual instances of a stream tier 402, an event source datastore (ESDS) 460, stream service 420, and cache 430. The storage service(s) 400, 500 may be used by other services, such as the external service 210, over a suitable API 32 (e.g., a private API as discussed previously). In FIG. 4, each instance of the web tier 401 includes a respective event processor 404 that processes requests received from external services/systems 210, and appends events to an event log 205 in the ESDS 410. Additionally, each instance of the stream tier 402 includes a respective aggregate processor 405 that aggregates events 215 in the event log 205 into an aggregation table 207. In FIG. 5, each instance of the web tier 401 includes a respective aggregate processor 405 that processes requests received from external services/systems 210, and provides aggregate states 208 to the requesting service 210.

The individual instances of the web tier 401 (or individual instances of the event processors 404) and individual instances of the stream tier 402 (or individual instances of the aggregate processors 405) are implemented as one or more app servers 100, one or more virtual machines (VMs) operating on one or more app servers 100, and/or one or more application containers running in one or more VMs or on a host platform of the app servers 100. In one example, the web tier 401 and stream tier 402 are implemented using Heroku® provided by Heroku, Inc.® where individual instances of the event processor(s) 404 and individual instances of the aggregate processor(s) 405 run in respective dynos, which are isolated virtualized Unix® containers. In another example, the back-end layer (e.g., including ESDS 410, stream service 420, and cache 430) is implemented using Apache® HBase®, and individual instances of the event processor(s) 404 and individual instances of the aggregate processor(s) 405 run as respective HBase coprocessors.

The event processor(s) 404 and aggregate processor(s) 405 (collectively referred to as "stream processors" or the like) may be implemented as software components (e.g., software engines, software agents, artificial intelligence (AI) agents, modules, objects, or other like logical units), as individual hardware elements, or a combination thereof. In an example software-based implementation, the stream processors may be developed using a suitable programming language, development tools/environments, etc., which are executed by one or more processors of one or more computing systems (see e.g., processor system 17 of FIG. 1B). In this example, program code of the stream processors may be executed by a single processor or by multiple processing devices. In an example hardware-based implementation, stream processors are implemented by respective hardware elements, such as GPUs (or floating point units within one or more GPUs), hardware accelerators (e.g., FPGAs, ASICs, DSPs, SoCs, etc.) that are configured with appropriate logic blocks, bit stream(s), etc. to perform their respective functions, AI accelerating co-processor(s), tensor processing units (TPUs), and/or the like.

Referring back to FIG. 4, at node 1, the external service 210 (or an individual user system 12) operates an application that sends an event 215 to the web tier 401. In some embodiments, the event 215 may be sent to the using the HTTP POST method. A request to append the event 215 to an event log 205 may accompany the event 215, or the event 215 itself may act as a request to append the event 215 to the event log 205. In the inventory example, the inventory event 215 may have a reservation type or an adjustment type. An example of an inventory event 215 message payload is shown by table 4-1.

TABLE 4-1 example event message payload

{
"agg_id" : "yeezy",
"id" : "123e4567",
"seq_num" : 1,
"type" : "reservation",
"location" : "SLC",
"quantity" : 5
}

In this example, the agg_id field is an SKU, the ID field includes a line item ID, the type field is one of an adjustment or reservation, the location field indicates a location from which the event is received, and the quantity field may indicate the amount of an item that is ordered. The web tier 401 receives the events 215, and the event processor(s) 404 implements the functionality of appending to the events 215 to the event log 205 in the ESDS 410 at node 2. The event processor(s) 404 also enforces ordering of events, idempotence, and constraints.

In some embodiments, the event processor(s) 404 may perform an HTTP PUT method to send the events 215 to the ESDS 410 to be included in the event log 205. The HTTP message may invoke an API 32 to insert or append an event 215 to the event log 205. In some embodiments, the API 32 may include an event object, which has a function called "event. insert" or "event. append." The event. insert takes the event 215 without the SN as an input, and returns an SN for that event 215. Other information may be returned for the event 215 as well. Because the event processor(s) 404 enforces constraints, it is possible that in the event.insert returns an error indicating that a constraint has been violated or that the event 215 is a duplicate entry. In the inventory example, the returned error may indicate that there is insufficient inventory given the reservation trying to be placed and may return a duplicate together with the original output in error message.

The ESDS 410 is a non-relational distributed database structure that includes various database objects that are not stored using relations. For example, the ESDS 410 may be a key-value datastore that stores and manages associative arrays or hash tables. A key-value datastore is a type of non-relational database that stores data in key-value pairs (KVPs), where a key of a KVP is a unique identifier used to retrieve a corresponding value of that KVP. Individual records in the key-value datastore may be a set of one or more KVPs. Any type of data (e.g., characters, numbers, strings, etc.) can be used as keys and values can be any type of data. Key-value databases are highly partitionable and enable scaling that other types of databases, such as relational databases, cannot achieve. In embodiments, the ESDS 410 may be implemented using DynamoDB® provided by Amazon.com®, MongoDB™ provided by MongoDB Apache® Cassandra™, Apache® HBase™ which runs on top of Apache® Hadoop®, Redis™ provided by Redis Labs™, Oracle NoSQLDatabase™ provided by Oracle Corp.®, and/or the like.

In some embodiments, the event log 205 may be implemented by two individual NoSQL tables, an event table and an event ID index table. An example implementation of the event table of the event log 205 in the ESDS 410 is shown by table 4-2 and an example index table for the event log 205 is shown by table 4-3.

TABLE 4-2 example event table for an events log

| agg_id | seq_num | error | data |
| --- | --- | --- | --- |
| yeezy | 1 | | {"id": "a1", "type": "adjustment", "quantity": 4} |
| yeezy | 2 | | {"id": "r1", "type": "reservation", "quantity": −2} |
| yeezy | 3 | Constraint violated | {"id": "r2", "type": "reservation", "quantity": −3} |

TABLE 4-3 example event ID index table

| agg_id | id | seq_num |
| --- | --- | --- |
| yeezy | a1 | 1 |
| yeezy | r1 | 2 |
| yeezy | r2 | 3 |

In table 4-2, the agg_id field is a hash key (also referred to as a "partition key") and the seq_num field is a range key (also referred to as a "sort key"). Hash and range keys are concepts in NoSQL stores where the hash key determines a particular partition of the underlying datastore that the data goes through, and the range key allows different rows associated with a hash key to be stored. In particular, the partition key value may be input to a suitable hash function, which outputs an ID or address of the partition (e.g., physical storage device or portion thereof) in which the item record associated with that partition key is to be stored. Query results are sorted by the range key, for example, in numerical order if the data type of the range key is a number, or in order of ASCII character code values for non-numerical data type range keys. Additionally, in table 4-2 the actual payload of the event message received at node 1 (e.g., JSON content or the like) is stored in the data column. The error column stores error indicators of events 215 that have been determined to have violated one or more constraints. In these embodiments, an event 215 that violates one or more constraints is still persisted with that constraint violation so that if the user attempts to append the same event 215 to the event log 205 again, the same constraint violation error indicator can be sent back to that user.

Table 4-3 is an event ID index table, which uses a combination of the aggregate ID and the event ID as a composite hash key (also referred to as a "composite key"). In some embodiments, the composite hash key may be a combination of the aggregate ID and the range key. Table 4-3 is used to ensure idempotency on events 215. In NoSQL databases it is not possible to execute a transaction across these two tables (e.g., a join operation) in the same way that is possible for relational databases. Therefore, the event processor(s) 404 performs an event insert function to insert events into the events table and performs the event ID table check in such a way to ensure that there are no duplicates. Example pseudocode for the event insert is shown by table 4-4.

TABLE 4-4 example event.insert pseudocode 01. aggregate = Aggregate.getForUpdate(event.aggregate_id); //uses PK (see below)
02. existing_event = EventIndexTable.get(event.aggregate_id, event.id, consistent=true);
03. if existing_event != NULL: //enforce id uniqueness
04.     return 'duplicate' + existing_event | existing_event.error;
05. event.error = checkConstraints(aggregate, event); //enforce user-defined constraints
06. event.sequence_number = aggregate.sequence_number + 1;
07. EventTable.put(event, condition: not_exists(aggregate_id, sqnr)); //enforce sequence
08. if failed (already exists):
09.     aggregate = Aggregate.getForUpdate(event.aggregate_id, aggregate.sequence_number);
10.     retry: goto line 2 (or timeout after n attempts);
//could maintain in-memory index and do this async (when completed remove from memory)
11. EventIndexTable.put(event.aggregate_id, event.id, event.sequence_number)
12. return event | event.error In the example of table 4-4, the event.insert starts by retrieving the current aggregate state 208 (line 01), and then performs a read on the event ID index table (e.g., table 4-3) (line 02). The event insert then enforces event ID uniqueness by checking if there is already an ID in the event ID index table (line 03). If the ID is already in the table (line 03), a failure or error condition is triggered for the uniqueness constraint, and the event.insert will return a message indicating that the event 215 is a duplicate (line 04). If the event 215 is not already present, the event. insert checks the user-defined constraints against the current aggregate state 208 that was loaded (line 05), and increments the sequence number by one (line 06). This provides the monotonically increasing/sequential sequence numbers discussed previously since the sequence number for an event 215 is one more than a previously appended event 215.

The event.insert then enforces the sequence by performing a conditional insert operation (line 07), which is a feature of NoSQL databases. If the conditional insert succeeds (line 07), then no other user or process of the external service 210 has tried to insert a concurrent event 215 with a same sequence number into the event log 205. On the other hand, if another client concurrently tries to append an event 215 to the event log 205, then that event 215 would have been assigned the same sequence number as the currently processed event, and the conditional insert operation will fail. If the conditional insert fails (line 08), then a retry operation is performed by looping back to reload the aggregate state 208 (lines 09-10) to restart this process (line 02). These operations may be considered a type of optimistic concurrency control to ensure invariance of the event log 205 is preserved, uniqueness of the events 215, and that the constraints hold. After a number of retries, the process may end and an error message may be sent to the external service 210. Then the event ID index table is updated (line 11) to insert the event ID of the event 215 that was appended to the events log 215 to ensure that there are no duplicates inserted. Results of the insert operation are then returned to the requesting party (line 12).

In some embodiments, requests for the same aggregate ID are routed to the same event processor 404 or a VM or container (e.g., a dyno in Heroku® implementations) containing the event processor 404. Routing requests to the same event processor 404 (as much as possible) allows the system 16 to reduce the likelihood of query aggregations for each event 215, contention based retries, bottlenecks, and/or overload situations. Additionally, routing requests in this way allows the event processor 404 to cache the aggregate states 208 and sequence events (e.g., in cache 330), which allows the event processor 404 to avoid performing look up operations between write operations, which increases throughput efficiencies and reduces computational overhead. So that's a routing optimization. In other words, caching the aggregate states 208 and the event sequences conserves computational resources since the same event process 404 does not have to load the aggregate state from the ESDS 410 (e.g., line 02 in table 4-4) to enforce constraints. An example pseudocode for these routing optimizations is shown by table 4-5.

TABLE 4-5 example routing optimization pseudocode 01.     eventProcessor_id = hash(event.aggregate_id) % num_event-Processor;
02.     if (eventProcessor_id == this eventProcessor):
03.         process event on this eventProcessor;
04.     else {
05.         forward event to eventProcessor with eventProcessor_id;

In the example of table 4-5, an event processor ID is set to be a hash of a modulo operation of the aggregate ID of an event 215 and the number of event processors 404 (line 01). Other methods of assigning event processor IDs to event processors 404 and/or methods for determining an event processor ID can be used in other embodiments. If the event processor ID is the event processor ID of the present event processor 404 (line 02), then the event 215 is processed by the event processor 404 (line 03). Otherwise (line 04), the present event processor 404 is forwarded to the event processor 404 having the event processor ID (line 05). The event insert may be modified to include the routing optimization of table 4-6.

TABLE 4-6 example event.insert with routing optimization pseudocode 01. locks[e.aggregate_id].lock( )
02. if (cache[e.aggregate_id] == null):
03.     cache[e.aggregate_id] = Aggregate.get(e.aggregate_id, consistent=true);
04. aggregate = cache[e.aggregate_id];
05. existing_event = EventIndexTable.get(event.aggregate_id, event.id, consistent=true);
06. if existing_event != NULL:
07.     locks[e.aggregate_id].unlock( );
08.     return 'duplicate' + existing_event | existing_event.error;
09. event.error = checkConstraints(aggregate, event); // enforce user-defined constraints
10. event.sequence_number = aggregate.sequence_number + 1;
11. EventTable.put(event, condition: not_exists(aggregate_id, sqnr)) // enforce sequence;
12. if failed (already exists):
13.     cache[e.aggregate_id] = null;
14.     retry: goto 2 (or timeout after n attempts);
//could maintain in-memory index and do this async (when completed remove from memory)
15. EventIndexTable.put(event.aggregate_id, event.id, event.sequence_number);

TABLE 4-6-continued example event.insert with routing optimization pseudocode

```
16.    cache[e.aggregateId] = aggregate.add(event);
17.    locks[e.aggregate_id].unlock( );
18.    return event | event.error
```

The correctness of the event.insert of table 4-6 is guaranteed by the underlying implementation in the same manner as discussed previously, and concurrent processes are guarded by an optimistic lock on the sequence number (lines 01, 07, and 17). Aggregate states 208 are cached to preserve consistency property of aggregate queries. The lock ensures that only one thread in critical sections (lines 01, 07, and 17). Additionally, if the conditional insert fails (line 13), the cache for the aggregate state 208 is cleared (line 14) and reloaded on retry (lines 02-03).

In some embodiments, groups or batches of events 215 ("micro-batches") may be sent by the event processor(s) 404 to be written in the ESDS 410 at node 2 rather than, or in addition to, writing to the ESDS 410 on an event-by-event basis. In these embodiments, multiple events 215 to be appended to a particular event log 205 can be written as a single record in the event logs 205, which reduces write latency and optimizes throughput on a per event log 205 basis. The number of events 215 to be batched or grouped together by the event processor 404 may be a predefined or configured value. In some embodiments, some or all events 215 revived within a predefined or configured period of time (e.g., up to a predefined or configurable threshold) may be batched. For example, a micro-batch may be configured such that all events 215 received within 10 milliseconds up to 10 events 215 are batched and written to the event log 205. In the micro-batching embodiments, the batched events 215 may be inserted into the event log 205 as a composite event. For example, one record in the event log 205 would self-contain five batched events 215 instead using five records for five individual events 215. An example pseudocode for the micro-batching optimization is shown by table 4-7.

TABLE 4-7 example micro-batching pseudocode

```
01.    events = take up to 10 events from request queue
02.    locks[e.aggregate_id].lock( )
03.    if (cache[e.aggregate_id] == null):
04.        cache[e.aggregate_id] = Aggregate.get(e.aggregate_id,
consistent=true);
05.    aggregate = cache[e.aggregate_id];
06.    existing_events = EventIndexTable.batchGet(events -> ids,
consistent=true);
07.    for i in existing_events.length:
08.        if existing_events[i] != NULL:
09.            result[i] = 'duplicate' + existing_events[i] |
existing_events[i].error;
10.        else:
11.            batch[i] = events[i];
12.    checkConstraints(aggregate, batch); //enforce user-defined
constraints
13.    event = new Event(aggregate.sequence_number + 1, microbatch);
//multiple events in row
14.    EventTable.put(microbatch, condition: not_exists(aggregate_id,
sqnr));
15.    if failed (already exists):
16.        cache[e.aggregate_id] = null;
17.        retry: goto 2 (or timeout after n attempts);
//could maintain in-memory index and do this async (when completed
remove from memory)
18.    EventIndexTable.batchPut(microbatch, event.sequence_number);
```

TABLE 4-7-continued example micro-batching pseudocode

```
19.    cache[e.aggregateId] = aggregate.addAll(batch);
20.    locks[e.aggregate_id].unlock( );
21.    return result
```

When the event 215 is written into the ESDS 410, the request for appending the event 215 is completed from the perspective of the external service 210. In some embodiments, the event processor(s) 404 may send a suitable response message to the external service 210 indicating that the event was successfully appended to the event log 205 (e.g., an HTTP Response message with a suitable status code). A payload portion of the response message may include the information returned from calling the event. insert, such as the SN and/or other returned information.

At node 3, a stream is processed asynchronously by the stream service 420. The stream service 420 is an object, application, process, software engine, or other like entity that reads an immutable ordered stream of updates made to the ESDS 410. In embodiments where the ESDS 410 is implemented using DynamoDB®, the stream service 420 may be implemented using DynamoDB Streams provided by Amazon.com®. An item or data entry is written to the stream service 420 when an update is performed on the ESDS 410, such as when the event processor(s) 404 append an event 215 to an event log 205. The stream service 420 captures a time-ordered sequence of item-level modifications in an ESDS 410 table, such as the event log 205, and stores that sequence of modifications as stream records for a predefined period of time. In some implementations, the ESDS 410 may be a producer that asynchronously pushes data to the stream service 420, and one or more consumers process the data in real time. In these implementations, the consumers may be the aggregate processor(s) 405, which obtain the pushed data at node 4.

At node 4, the aggregate processor(s) 405 access a series of stream records in near real time. In some implementations, the aggregate processor(s) 405 may access the stream records using an HTTP GET method. The events 215 that originate from that asynchronous stream are loaded into the aggregate processor(s) 405, and the aggregate processor(s) 405 evaluate the constraints and formulas that were specified by the external service 210. Continuing with the inventory example, the aggregate processor(s) 405 may retrieve or otherwise obtain a chunk or batch of five events 215 where four of the events 215 are reservations and one of the events 215 is an inventory adjustment, which may indicate that an item has been shipped from a warehouse. In this example, the aggregate processor(s) 405 evaluates the user-defined formulas to determine a new state of the inventory by, for example, adding four to the reservation count and decrementing one from an on-hand value. The aggregate processor(s) 405 then determines a new ATS value as the difference between the on-hand value and the reservation count. These values may be computed as an aggregate state 208, and written to the cache 430 and ESDS 410 at nodes 5 and 6, respectively, using a suitable message, an example of which is shown by table 4-8.

TABLE 4-8

| example aggregate state message payload |
|---|
| {<br>"agg_id" : "yeezy",<br>"seq_num" : 2,<br>"on_hand" : 10,<br>"reserved_quantity" : 7,<br>"ats" : 3<br>} |

In the example of table 4-8, the aggregate processor(s) 405 calculates the on-hand quantity as on_hand=sum (event.quantity) where event.type='adjustment'; calculates the reserved quantity as reserved_quantity=sum (event.quantity) where event.type='reservation'; and calculates the ATS as ats=max (0, on_hand_quantity-reserved_quantity).

In embodiments, the aggregate processor(s) 405 may perform an HTTP PUT method to send the aggregate states 208 to the cache 430 and the ESDS 410. In some embodiments, the aggregate processor(s) 405 may perform a write-through operation to write the aggregate states 208 to the cache 430 and ESDS 410, where a write operation is performed synchronously to both to the cache 430 and to the ESDS 410. The HTTP message may invoke an API 32 to write the aggregate states 208 to corresponding aggregate tables 207. In some embodiments, the API 32 may include an aggregate object (or aggregation object), which has a function called "aggregate.insert" or "aggregate.update" that takes the aggregate state 208 as an input, and returns a suitable status code based on the success or failure of the write operation. Other information may be returned for the event 215 as well, such as a timestamp of the request, timestamp of appending the event 215 to the event log 205, and/or other like information. The aggregate.update function may operate in a same or similar manner as the event insert function discussed previously.

As alluded to previously, the aggregate states 208 are written through a cache 430 at node 5 and then to an aggregate table 207 in the ESDS 410. The cache 430 may be an in-memory data store and/or cache service, and/or dedicated (physical or logical) memory area or region that may be used to store resources, such as updated aggregate states 208. In some embodiments, the cache 430 or the aggregate processor(s) 405 may implement an in-memory caching engine (e.g., memcached, Redis, etc.) to store the aggregate state 208 in the cache 430. In some embodiments, the cache 430 may be a web or database caching system/service implemented by the system 16. In these embodiments, the cache 430 may be a reserved section (or set of memory locations) of a memory system of the app servers 100. In some implementations, the cache 430 may include or may be embodied as one or more cache memory devices that the processor system 17 can access more quickly than other types of memory (e.g., such as an on-die cache, an on-processor cache, or an off-die cache that resides on same system on chip (SoC), system in package (SiP) as the processor system 17). In embodiments where the ESDS 410 is implemented using DynamoDB®, the cache 430 may be implemented using DynamoDB Accelerator (DAX) provided by Amazon.com®. Other caching systems, such as Redis® provided by Redis, Memcached, Ehcache™ provided by Terracotta, Inc.®, and the like, may be used in other embodiments.

In any of the aforementioned embodiments, the cache 430 may store the aggregate state 208 using the same data structure (e.g., as KVPs) as in the aggregate table 207. And as mentioned previously, the aggregate state 208 is written through the cache 430 at nodes 5 and 6. This means that, by the time after the aggregate write operation has been completed, both the aggregate table 207 and the cache 430 hold the updated values of the aggregate state 208. In some cases, if the cache 430 is heavily utilized or if the cache 430 system is restarted, some of the aggregate states 208 stored in the cache 430 may get evicted. For the most part, writing the aggregate states 208 through the cache 430 allows the aggregate states 208 to be pre-cached before a client/user attempts to read the aggregate states 208, which provides a greater throughput at least when compared to accessing records directly from the ESDS 410. An example implementation of the aggregate table 207 in the ESDS 410 is shown by table 4-9.

TABLE 4-9

| example aggregate table ||| |
|---|---|---|
| agg_id | seq_num | body |
| yeezy | 3 | {"on_hand": 5, "type": "typeValue", "field1": x1} |

In the example of table 4-9, the aggregate state 208 for the agg_id "yeezy" is computed up to the seq_num of "3". The body field includes the actual content that was computed for the aggregate state include an on-hand value of an on-hand field, a type value for a type field, and a user-defined field (e.g., "field1" in table 4-9). Additionally, in this example, the agg_id field is a primary key, which is a unique identifier that distinguishes a record/aggregate state 208 in the aggregation table 207 from all other records/aggregate states 208 in the aggregation table 207. In some embodiments, the seq_num field may be a range key to allow for storing aggregate snapshots, which is discussed in more detail infra.

Referring now to FIG. 5, which shows storage service 500 illustrating logical interactions between the elements of FIGS. 1A-3 for accessing events 215 from the event sourcing log according to various embodiments. As mentioned previously, in storage service 500, each instance of the web tier 401 includes a respective aggregate processor 405 that serves content to external services/systems 210, including aggregate states 208 stored in the cache 430 and/or ESDS 410, in response to a query from individual user systems 12.

At node 1, a query may be generated and sent by the external service 210 to the web tier 401. In embodiments, the query may be generated and sent based on user interactions with a platform of the external service 210. For example, when the external service 210 is an ecommerce platform, a user system 12 may request and render a product detail page of that platform, which may cause the external service 210 to generate a query for the aggregate state 208. Such a query may be transmitted to the web tier 401 at node 1 using a suitable message, such as an HTTP GET message.

At node 2, an aggregate processor 405 in the web tier 401 reads (or attempts to read) the current aggregate state 208 from the cache 430. In most cases, the aggregate state 208 is stored in the cache 430 because, as mentioned previously, the cache 430 was pre-populated with the aggregate states 208. This caching mechanism provides relatively high read throughput on the order of millions of read operations per second. If the requested aggregate state 208 is not in the cache 430, at node 3, the aggregate processor 405 obtains the aggregate state 208 from the aggregation table 207 in the ESDS 410 using a suitable message (e.g., an HTTP GET message).

In embodiments, the aggregate processor(s) 405 may use a suitable message, such as an HTTP message (e.g., perform an HTTP GET method), to obtain the aggregate state 208 from the cache 430 and/or the ESDS 410. The HTTP message may invoke an API 32 to request and/or retrieve the aggregate state 208 from the cache 430 and/or the ESDS 410. In some embodiments, the API 32 may include an aggregate object, which has a function called "aggregate.get" or the like. The aggregate.get may take the agg_id of the aggregate state 208 as an input, and returns the aggregate state 208 for that agg_id. Other information may be returned with the agg_id as well, such as a timestamp of the request, timestamp of the update to the aggregation table 207 (or a time when the aggregate state 208 was last updated), and/or other like information. In some embodiments, at node 2 the aggregate.get may return an error message with a suitable status code (e.g., an HTTP 3xx or 4xx status code) indicating that the aggregate state 208 is not located in the cache 430. A similar error message may be returned at node 3 if the aggregate state is not located in the ESDS 410. Example pseudocode for the aggregate.get is shown by table 4-10.

TABLE 4-10 example aggregate.get pseudocode

```
01.    aggregate = new Aggregate( );
02.    events = EventLogTable.query(aggregate_id = :aggregate_id,
consistent = :consistent);
03.    for event in events:
04.        aggregate = aggregate.add(event) // see below;
05.    return aggregate;
06.    aggregate.add(event):
07.        aggregate.sequence_number = event.sequence_number;
08.        if checkConstraints(event):
09.            updateAggregationFields(event);
10.            updateComputedFields(event);
```

In the example of table 4-10, the aggregate.get queries the event log 205 (lines 01-02). If the query is a consistent query, the aggregate.get searches through the event log 205 (lines 03-04), retrieves the events 215 in the event log 205 (line 08), and then adds them to the aggregate state 208 (lines 09-10). The aggregate.get also stores the last sequence number that was retrieved (line 07). The aggregate state 208 contains all successfully written events 215 as of the time that the query was issued, which ensures strong consistency (i.e., "linearizability") meaning that, at the time the aggregate state 208 is read, the system 16 can be confident that all events 215 that have been inserted into the event log 205 up to that point are actually part of the aggregate state 208. In other words, for each event 215 included in the event log 205, the aggregate state 208 also included previous event where newer events 215 have higher sequence numbers than older events 215 and events are never removed.

In some embodiments, the API 32 may include another aggregate object, which has a function called "aggregate.getForUpdate" that may be used to guarantee that the event ID index table (e.g., table 4-3) is populated up to the returned sequence number. The aggregate.getForUpdate is also called by the event insert algorithm (see e.g., line 01 of table 4-4). The aggregate.getForUpdate is used to ensure that all events 215 that are in the event log 205 have in fact been inserted into the event log 205. Example pseudocode for the aggregate.get is shown by table 4-11.

TABLE 4-11 example aggregate.getForUpdate pseudocode

```
01.    known_good = split(known_good_sequence_number)[0];
02.    aggregate = new Aggregate( );
03.    for event in EventLogTable.query(aggregate_id = :aggregate_id,
consistent = true):
04.        if event.sequence_number > known_good:
05.            id_entry = EventIndexTable.get(event.aggregate_id,
event_id);
06.            if id_entry == null:
07.                EventIndexTable.put(event.aggregate_id, event.id,
event.sequence_number);
08.        aggregate = aggregate.add(event);
09.    return aggregate
```

In the example of table 4-11, the aggregate.getForUpdate may take an agg_id and a seq_num that is known by the caller at that point in time (e.g., "known good sequence number" in table 4-11) (line 01), and loads the current aggregate state 208 (line 02), then loads all newer events from the event log 205 (line 03). For each of those events (line 03), the aggregate.getForUpdate ensures that the corresponding entry for each event log 205 line exists in the event ID index table (lines 05-07). This check is used because transactions cannot be atomically inserted into NoSQL datastores as is possible for relational databases. For example, it is possible that the system 16 crashes immediately after the event. insert inserts an event 215 into the event log 205, and the aggregate state 208 information is not inserted into the event ID index table (e.g., EventIndexTable.put at line 11 in table 4-4 does not take place). In this way, the aggregate.getForUpdate can be considered a read repair operation for the event ID index table.

In some embodiments, the aggregate.get function may be used to write snapshot states 208 to the aggregate tables 207. In these embodiments, the aggregate processor(s) 405 listen for changes to the event log 205 (e.g., the event updates from the stream service 420), and periodically aggregates the aggregate states 208 by, for example, reading the current aggregate state 208 from an aggregate table 207, computing a new aggregate state 208, and then writing the new aggregate state 208 to the aggregate table 207 conditioned on the new aggregate state 208 having a new sequence number. Snapshotting is used to conserve computational and/or network resources by reducing the number of times new aggregate states 208 are read from, and written to, the aggregate table 207. Example aggregate snapshot pseudocode is shown by tables 4-12(a) and 4-12(b).

TABLE 4-12(a)

example Aggregate Snapshot pseudocode

```
01.    aggregate = Aggregate.get(aggregate_id, consistent=true);
02.    AggregateTable.put(aggregate, condition:
aggregate.sequence_number > sequence_number);
```

TABLE 4-12(b)

example Aggregate Snapshot pseudocode

```
01.    aggregate = AggregateTable.get(aggregate_id); //either strong or
weak consistency
02.    if aggregate.sequence_number > sequence_number:
03.        aggregate = new Aggregate( ); //could use older snapshots if
present
```

TABLE 4-12(b)-continued example Aggregate Snapshot pseudocode

```
04.    events = EventLogTable.query(aggregate_id,
05.            :aggregate.sequence_number < sequence_number 06.
consistent=true);
07.    for event in events:
08.        aggregate = aggregate.add(event); // see below
09.    return aggregate
```

In the example of tables 4-12(a) and 4-12(b), the conditional statement (line 02 in table 4-12(a) and line 05 in table 4-12(b)) reduces number of events that have to be queried by adding lower bound. The lower bound is the same as before if the requested sequence number is before the aggregate (line 03 in table 4-12(b)). The lower bound holds if the requested sequence number is after aggregate because the aggregate includes all events up to and including its sequence number since it was computed using a consistent query. The conditional statement ensures that the aggregate states 208 are always advanced to newer version even in cases where concurrent write operations are performed by different aggregate processors 405 for writing the snapshot state to the current aggregate record 208. In addition, the seq_num field in the aggregate table 207 (e.g., table 4-9) may be a range key to allow for storing old aggregate snapshots.

Figure 6:
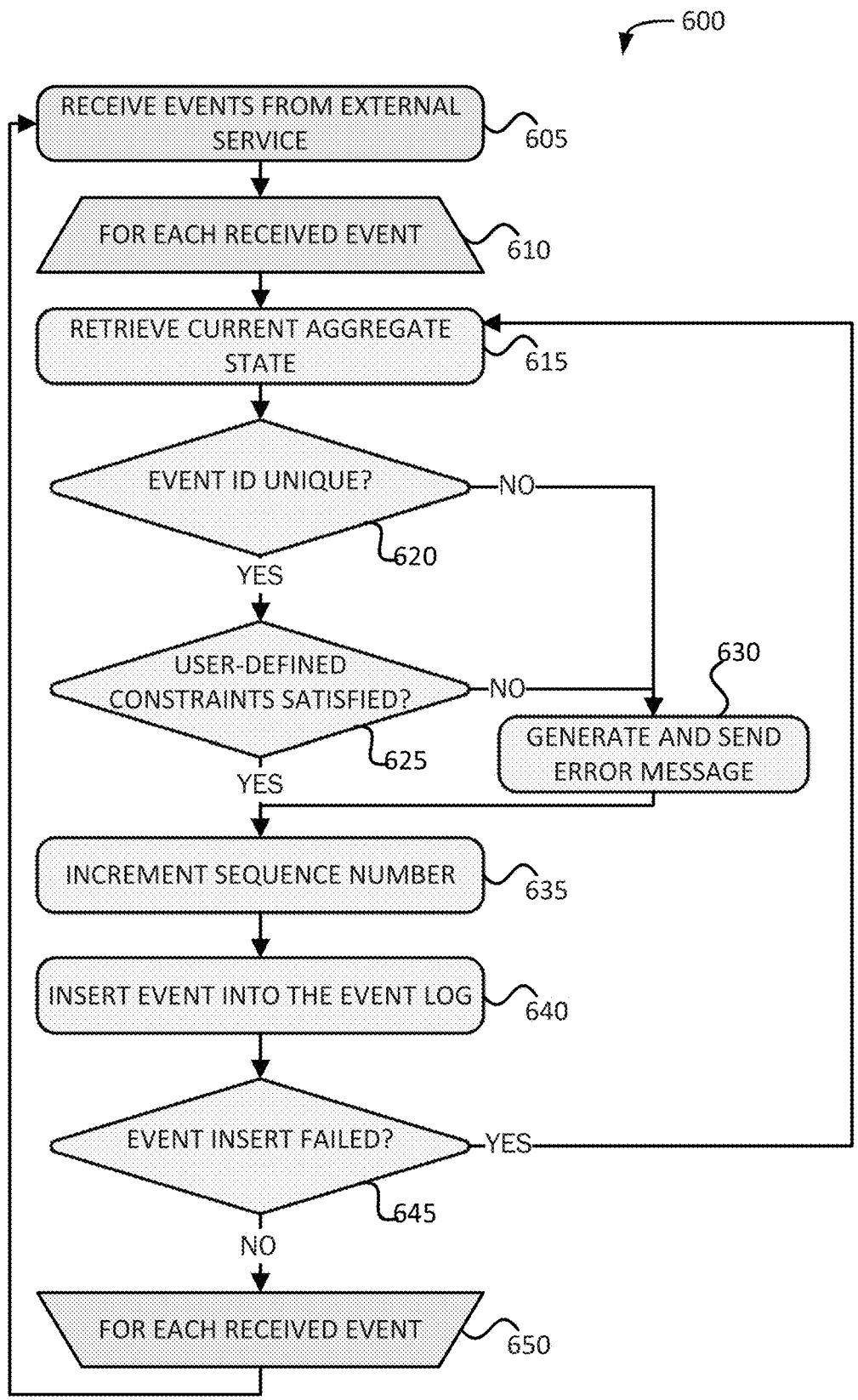
FIG. 6 illustrates a process for appending events to an event log, in accordance with various example embodiments.
Figure 7:
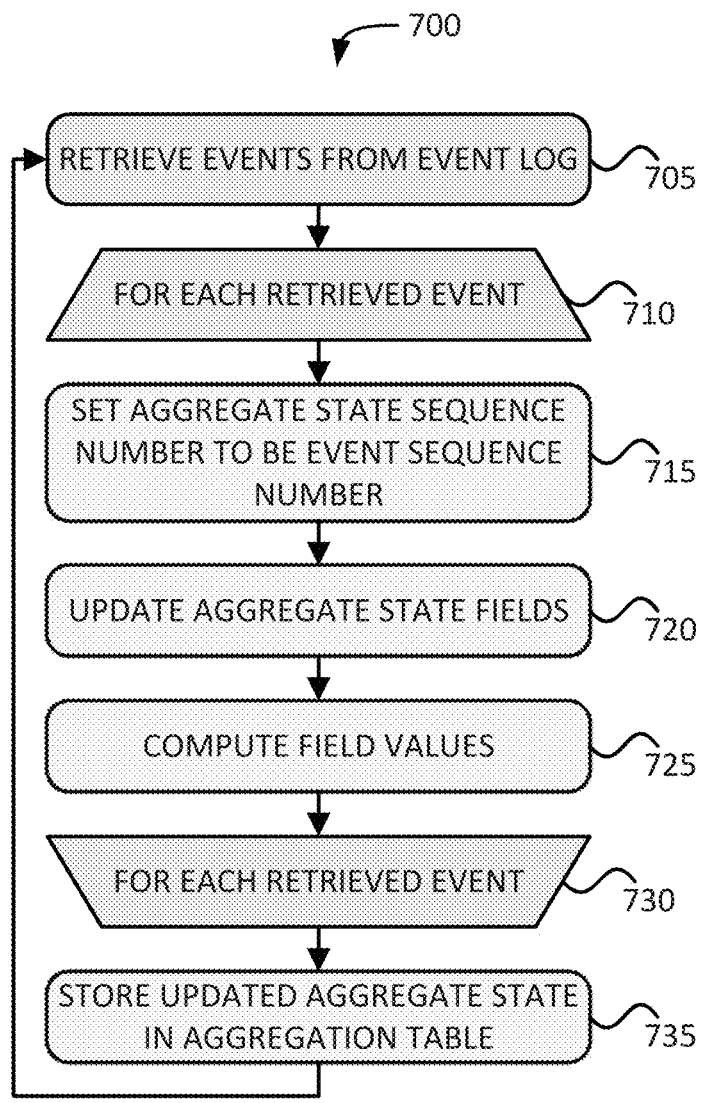
FIG. 7 illustrates a process for aggregating events, in accordance with various example embodiments.
Figure 8:
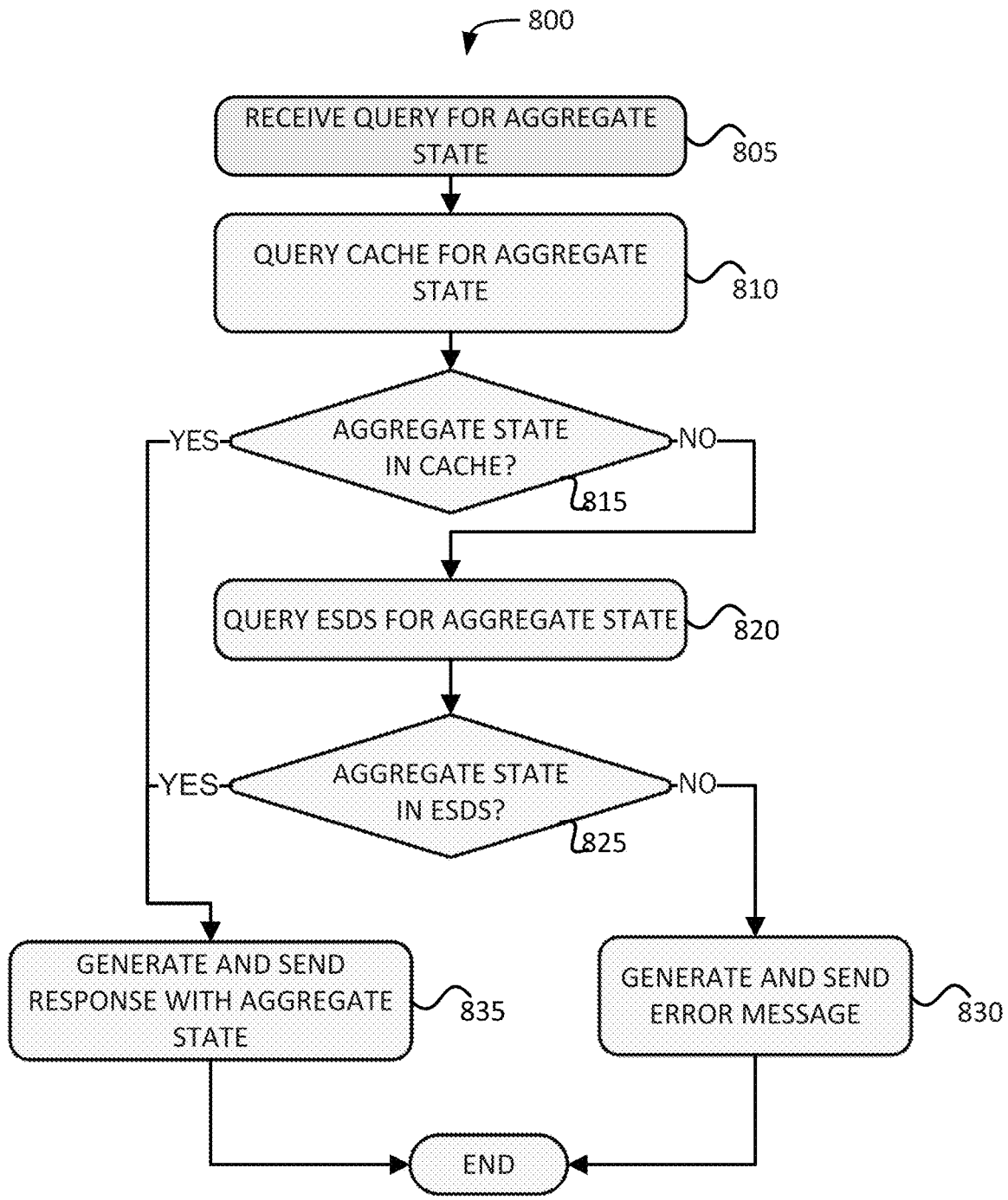
FIG. 8 illustrates a process for providing aggregate states to requesting users, in accordance with various example embodiments.

FIGS. 6-8 illustrates processes 600-800, respectively, in accordance with various embodiments. For illustrative purposes, the operations of processes 600-800 are described as being performed by elements/components shown and described with regard to FIGS. 1A-5. However, other computing devices may operate the processes 600-800 in a multitude of implementations, arrangements, and/or environments. In embodiments, the computer system(s) includes program code stored in a memory system, which when executed by a processor system, causes the user computer system(s) to perform the various operations of processes 600-800. While particular examples and orders of operations are illustrated in FIGS. 6-8, in various embodiments, these operations may be re-ordered, separated into additional operations, combined, or omitted altogether.

FIG. 6 illustrates a process 600 for appending events 215 to an event log 205 according to various embodiments. Process 600 begins at operation 605 where an event processor 404 receives events from an external service 210. At open loop operation 610, the event processor 404 processes each received event 215, in turn. In some embodiments, the event processor 404 may batch multiple events 215, and in such embodiments, the following discussion of process 600 is applicable to each event batch.

At operation 615, the event processor 404 retrieves the current aggregate state 208 from the cache 430 or the aggregation log 207 in the ESDS 410. At operation 620, the event processor 404 enforces the uniqueness of the event ID for the event 215. In some embodiments, the event processor 404 may perform a read operation on the event ID index table (e.g., table 4-3), and check if there is already an event ID in the event ID index table for the current event 215. If at operation 620 the event processor 404 determines that the event ID is not unique (e.g., the event ID is already in the event ID index table), the event processor 404 proceeds to operation 630 to generate and send an error message to the external service 210. In embodiments, this message may indicate that the event 215 is a duplicate of an already existing event 215.

If at operation 620 the event processor 404 determines that the event ID is unique (e.g., the event ID is not in the event ID index table), the event processor 404 proceeds to operation 625 to determine whether the user-defined constraints are satisfied. In embodiments, the event processor 404 may check or compare the user-defined constraints against the current aggregate state 208 that was loaded at operation 605. If at operation 625 the event processor 404 determines that the user defined constraints are not satisfied, the event processor 404 proceeds to operation 630 to generate and send an error message to the external service 210. In embodiments, this message may indicate that the reason for the failure and/or other suitable information. After performance of operation 630, the event processor 404 proceeds to operation 635 to increment the sequence number for the event 215. If at operation 625 the event processor 404 determines that the user defined constraints have been satisfied, the event processor 404 proceeds to operation 635 to increment the sequence number for the event.

At operation 640, the event processor 404 inserts the event 215 with the incremented sequence number into the event log 205. In embodiments, the event processor 404 may perform a conditional insert operation to insert the event 215 into the event log 205. At operation 645, the event processor 404 determines whether the insert operation 640 was successful or not. If at operation 645 the event processor 404 determines that the insert operation failed, the event processor 404 proceeds back to operation 615 to retrieve the current aggregate state. In embodiments, this sequence may repeat a predetermined number of times (e.g., a number of "retries") before terminating process 600. If at operation 645 the event processor 404 determines that the insert operation did not fail (e.g., the conditional insert succeeds), the event processor 404 proceeds to close loop operation 650 to process a next received event 215 (or next batch of events 215), if any. After all received events 215 have been processed, the event processor 404 repeats the process 600 as necessary or may end.

FIG. 7 illustrates a process 700 for aggregating events according to various embodiments. Process 700 begins at operation 705 where an aggregate processor 405 retrieves events 215 from the event long 205. In embodiments, the events 215 may be streamed from the ESDS 410 to the aggregated processor 405 via a stream service 420 as discussed previously. In some embodiments, the aggregate processor 405 queries the event log 205 or the stream service 420. If the query is a consistent query, the aggregate processor 405 searches through the event log 205, and retrieves the events 215 in the event log 205. At open loop operation 710, the aggregate processor 405 processes each retrieved event 215, in turn. In some embodiments, the aggregate processor 405 may aggregate snapshots of events 215, and in such embodiments, the following discussion of process 700 is applicable to each event snapshot.

At operation 715, the aggregate processor 405 sets a sequence number for the aggregate state 208 to be the sequence number of the event 215 currently being processed. When process 700 completes, the last sequence number that was retrieved may be stored in the aggregate state 208. At operation 720, the aggregate processor 404 updates the fields of the aggregate state 208. In embodiments, at least some of the aggregate state 208 fields are defined by the external service 210. At operation 725, the aggregate processor 405 computes the values for each field of the aggregate state 208. In embodiments, the external service 210 may define how the values for each field should be calculated. At close loop operation 730, the aggregate processor 405 processes a next event 215 (or snapshot), if any. Once all events 215 have been processed, the aggregate processor 405 proceeds to operation 735 to store the updated aggregate state 208 in the aggregate table 207. In embodiments, the aggregate processor 405 may perform a cache 430 write-through operation to write the updated aggregate state 208 to the cache 430 and subsequently store the updated aggregate state 208 in the ESDS 410. After operation 735, the aggregate processor 405 may repeat process 700 as necessary or the process 700 may end.

FIG. 8 illustrates a process 800 for providing aggregate states 208 to requesting users according to various embodiments. Process 800 begins at operation 805 where the aggregation processor 405 receives a query for an aggregate state 208. In embodiments, the query may be based on interactions with an external service 210 platform or website. At operation 810, the aggregate processor 405 queries the cache 430 for the aggregate state 208. At operation 815, the aggregate processor 405 determines whether the aggregate state 208 is in the cache 430 (e.g., whether there is a cache hit in the cache 430 and/or whether the aggregate state 208 is returned to the aggregate processor 405 from the cache 430). If at operation 815 the aggregate processor 405 determines that the aggregate state 208 is in the cache 430 (e.g., the aggregate states 208 is returned by the cache 430), the aggregate processor 405 proceeds to operation 835 to generate a response including the aggregate state 208, which is then transmitted to the requesting party.

If at operation 815 the aggregate processor 405 determines that the aggregate state 208 is not in the cache 430, the aggregate processor 405 proceeds to operation 820 to query the ESDS 410 for the aggregate state 410. At operation 825, the aggregate processor 405 determines whether the aggregate state 208 is in the ESDS 410 (e.g., whether the aggregate state 208 is returned to the aggregate processor 405 from the ESDS 410). If at operation 825 the aggregate processor 405 determines that the aggregate state 208 is in the ESDS 410 (e.g., the aggregate states 208 is returned by the ESDS 410), the aggregate processor 405 proceeds to operation 835 to generate a response including the aggregate state 208, which is then transmitted to the requesting party. If at operation 825 the aggregate processor 405 determines that the aggregate state 208 is not in the ESDS 410, the aggregate processor 405 proceeds to operation 830 to generate and transmit an error message to the requesting party. The error message may indicate the error or failure, and the reason for the error and/or error. After operation 830 or 835, the aggregate processor 405 may repeat process 800 as necessary or the process 800 may end.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, includes a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A non-transitory computer-readable media (NTCRM) comprising instructions for providing an event sourcing data storage service that, when executed by at least one processor are configurable to cause the at least one processor to:
append each event received from an external service to an event log when each event satisfies one or more constraints defined by an event object in an event sourcing definition, the event log being stored in an event sourcing datastore (ESDS), the ESDS being a non-relational distributed database that includes one or more database objects that are not stored using relations of a relational database model, wherein appending events to the event log includes application of the one or more constraints to an event sourcing template, the event sourcing template indicating how each event is to be appended or inserted to the event log, and wherein appending events to the event log further includes:
batch a number of the events received from the external service within a time period, and
append or insert the batched events as a composite event in the event log, the composite event being an individual record in the event log including data of each of the number of the events;
generate, on a periodic basis, an aggregate state by aggregating one or more objects of the events stored in the event log using an aggregation formula, the one or more objects to be aggregated and the aggregation formula being defined by an aggregate object in the event sourcing definition, the aggregate state being a single record within an aggregation table;

store the aggregate state in a cache storage system and the aggregation table in the ESDS; and provide the aggregate state to a user system in response to a request for the aggregate state.

2. The NTCRM of claim 1, wherein the event object defines an aggregate identifier (agg_id), a sequence number (seq_num), and an event identifier (event_id), and the event object stores a primary key and a secondary uniqueness constraint, the primary key being a combination of the agg_id and the seq_num and the secondary uniqueness constraint being a combination of the agg_id and the event_id.

3. The NTCRM of claim 2, wherein the event sourcing template includes an aggregate object the aggregate object, the aggregate object includes the agg_id and the seq_num, and the aggregate object stores the agg_id as a primary key, wherein the seq_num in the aggregate object is used to determine a number of events in the event log used to calculate the aggregate state.

4. The NTCRM of claim 3, wherein the event sourcing definition comprises:

another event object to extend the event object of the event sourcing definition, the other event object indicating one or more event types of each event received from the external service and the one or more constraints; and another aggregate object to extend the aggregate object of the event sourcing template, the aggregate object indicating how fields in the event log are to be aggregated into the aggregate state.

5. The NTCRM of claim 3, wherein, to append or insert each event to the event log, the instructions, when executed, are configurable to cause the at least one processor to:

for each event to be appended to or inserted in the event log, retrieve the aggregate state from the cache storage system;

determine whether the retrieved aggregate state satisfies the one or more constraints when an event_id of the retrieved aggregate state is not included in the event log;

increment a seq_num of the event when the retrieved aggregate state satisfies the one or more constraints; and insert the event into the event log when the incremented seq_num does not already exist in the event log.

6. The NTCRM of claim 3, wherein, to obtain the aggregate state, the instructions, when executed, are configurable to cause the at least one processor to:

query the event log;

pull all events out of the event log having seq_nums greater than a seq_num of a previous aggregate state; and add the pulled events to the aggregate state.

7. The NTCRM of claim 1, wherein the cache storage system is implemented as a write-through cache system, and the instructions, when executed, are configurable to cause the at least one processor to:

perform a write-through operation such that the aggregate state is written to the write-through cache system and then written to the aggregation table in the ESDS.

8. An application server for providing an event sourcing data storage service, the application server comprising:

a network interface;

a non-transitory machine-readable storage medium (NTMRSM) configured to store software to provide the event sourcing data storage service; and a processor communicatively coupled with the NTMRSM and the network interface, the processor to execute the software that implements the event sourcing data storage service and is configurable to:

apply one or more constraints defined by an event object in an event sourcing definition to an event sourcing template, the event sourcing template indicating how events received from an external service are to be appended or inserted to an event log in an event sourcing datastore (ESDS), the ESDS being a non-relational distributed database that includes one or more database objects that are not stored using relations of a relational database model;

write, via the network interface, events received from the external service to the event log stored in the ESDS when the events satisfy the one or more constraints, wherein the processor is further configurable to:

batch a number of the events received within a time period, and write, via the network interface, the batched events as a composite event in the event log, the composite event being an individual record in the event log including data of each of the number of the events;

determine, on a periodic basis, an aggregate state by aggregating one or more objects of the events stored in the event log using an aggregation formula, the one or more objects to be aggregated and the aggregation formula being defined by an aggregate object in the event sourcing definition, the aggregate state being an aggregation of the events stored in the event log into a single record, and write, via the network interface, the determined aggregate state in an aggregation table stored by the ESDS; and the network interface is configurable to receive the events from the external service, and transmit one or more messages to the ESDS to write the events in the event log and to write the determined aggregate state in the aggregation table.

9. The application server of claim 8, wherein the event log comprises an event table and an event identifier index table, the event table comprises an aggregation identifier (agg_id) field as a hash key, a sequence number (seq_num) field as a range key, and an event identifier (event_id) field; the hash key indicating a partition of the ESDS to which the event log is stored; and the event identifier index table comprises the agg_id field and the event_id field as a composite hash key.

10. The application server of claim 9, wherein execution of the software is configurable to cause the processor, for each event received from the external service, to:

retrieve, via the network interface, a current aggregate state from the aggregation table;

perform, via the network interface, a read operation on the event identifier index table;

enforce uniqueness of an event identifier based on a determination as to whether the event identifier already exists in the event identifier index table;

enforce the one or more constraints defined by the external service via application of the one or more constraints against the current aggregate state;
increment a seq_num by one; and
perform, via the network interface, a conditional insert operation to insert the event with the incremented sequence number as a record in the event table.

11. The application server of claim 10, wherein execution of the software is configurable to cause the processor to:
write, via the network interface, the determined aggregate state in a caching system in addition to the aggregation table stored by the ESDS.

12. The application server of claim 11, wherein execution of the software is configurable to cause the processor, for each event received from the external service, to:
retrieve the current aggregate state from the caching system;
determine whether the current aggregate state satisfies the one or more constraints when an event_id of the current aggregate state is not included in the event log;
increment the seq_num when the current aggregate state satisfies the one or more constraints; and
write, via the network interface, the event into the event log when the incremented seq_num does not already exist in the event log.

13. The application server of claim 12, wherein, to determine the aggregate state, execution of the software is configurable to cause the processor to:
retrieve, via the network interface, all events from the event log up to a seq_num of a previous aggregate state; and
aggregate values of individual fields for each retrieved event according to the event sourcing definition defined by the external service.

14. The application server of claim 11, wherein, to write the events received to the event log, execution of the software is configurable to cause the processor to:
perform, via the network interface, a write-through operation such that the aggregate state is synchronously written to both the caching system and the aggregation table stored by the ESDS.

15. The application server of claim 11, wherein the network interface is configurable to:
receive a query for the aggregate state from the external service; and
transmit the aggregate state to the external service in response to receipt of the query.

16. The application server of claim 15, wherein execution of the software is configurable to cause the processor to:
serve, via the network interface, the aggregate state from the caching system in response to receipt of the query; and
serve, via the network interface, the aggregate state from the ESDS in response to receipt of the query when the aggregate state is not stored in the caching system.

17. The application server of claim 9, wherein execution of the software is configurable to cause the processor to:
retrieve, via the network interface, a current aggregate state from the aggregation table;
determine whether events in the event log having a seq num less than or equal to a seq num of the current aggregation state have a corresponding entry in the event identifier index table.

* * * * *